United States Patent Office 3,081,652
Patented Mar. 19, 1963

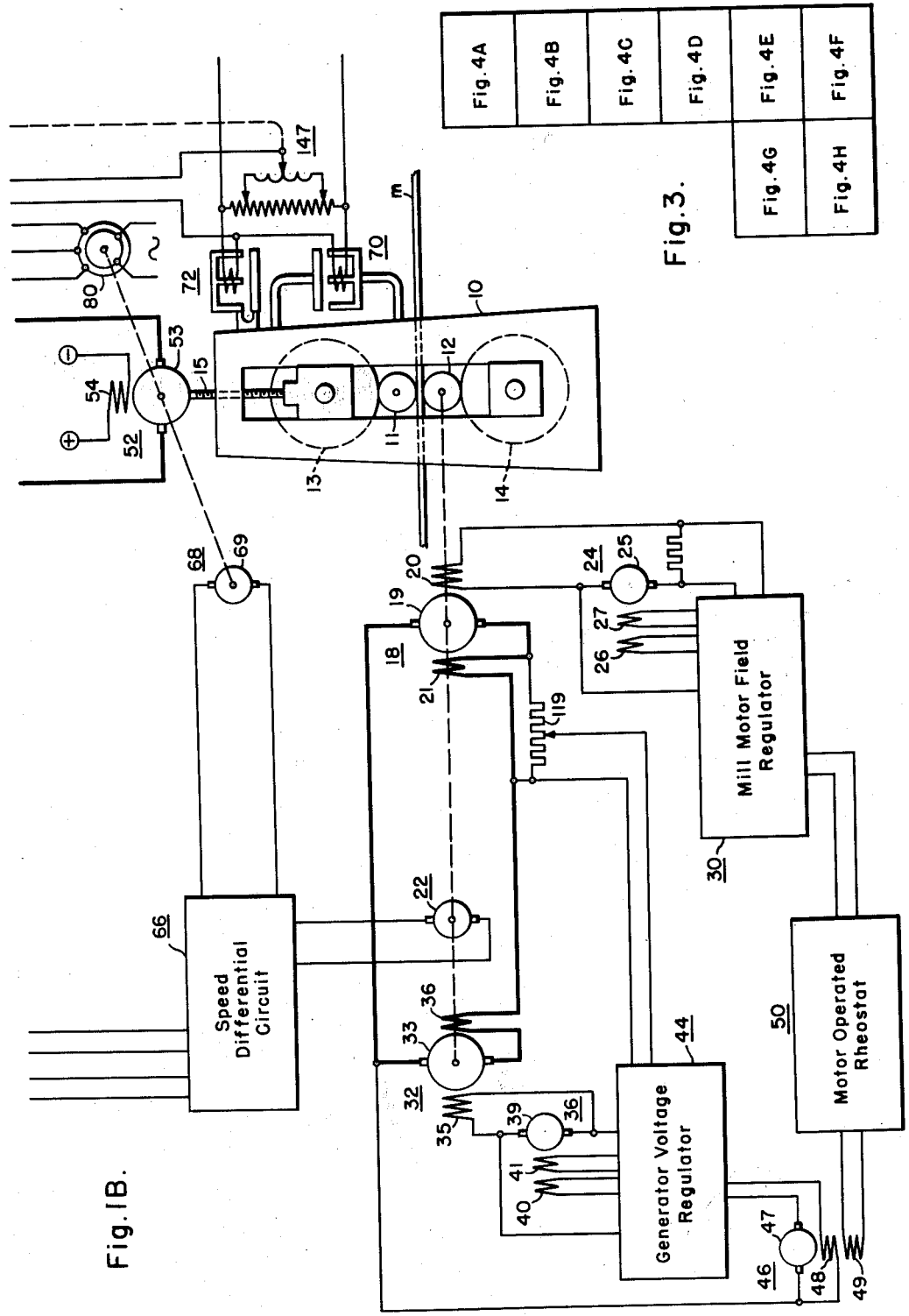

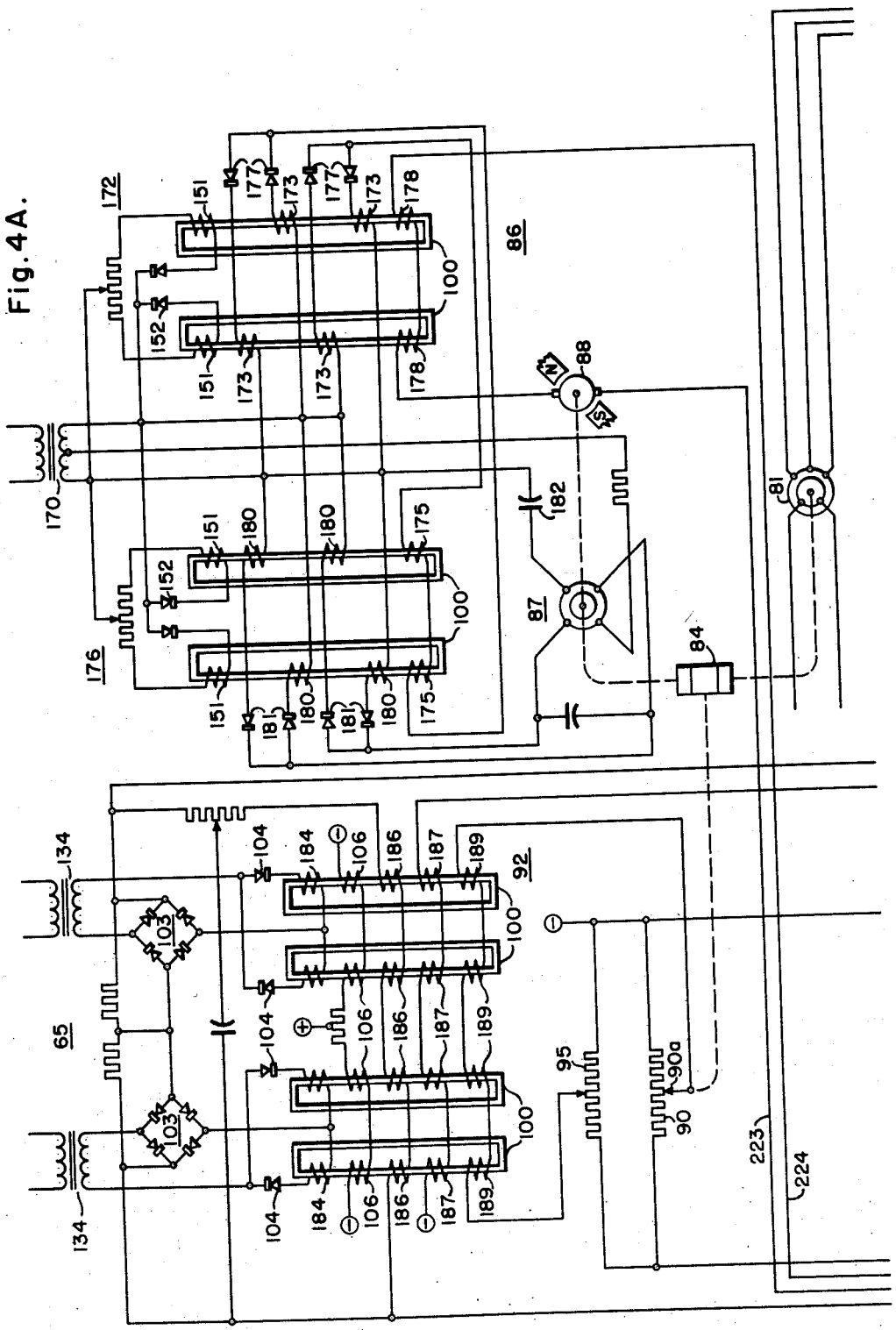

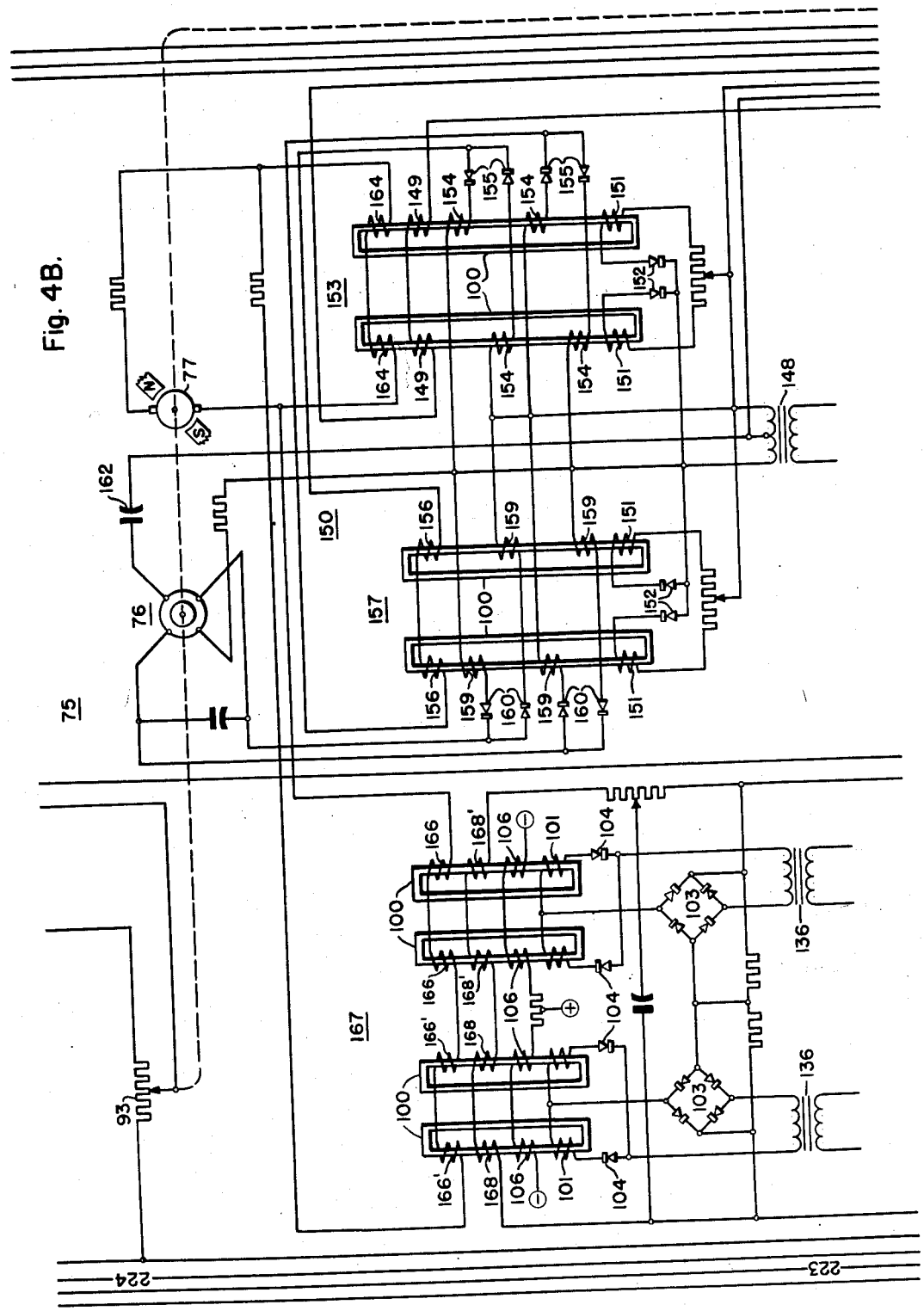

3,081,652
TAPER ROLLING MILL CONTROL
Ralph H. Wright, Edgewood, and Loren F. Stringer, Monroeville, Pa., assignors to Westinghouse Electric Corporation, East Pittsburgh, Pa., a corporation of Pennsylvania
Filed Nov. 30, 1955, Ser. No. 550,134
21 Claims. (Cl. 80—56)

Our invention relates, generally, to motor control systems, and it has reference in particular to a control system for controlling the roll and screw-down motors of a rolling mill for both taper and flat rolling.

Generally stated, it is an object of our invention to provide a reliable and accurate rolling mill control system for producing hot or cold rolled material which is either flat or tapered in the direction of rolling.

More specifically, it is an object of our invention to provide for producing taper rolled material by using both profile control, and control of the taper rate.

Another object of our invention is to provide for using a taper rate control system for effecting control of the taper of a strip of material being rolled, and modifying such control by means of a profile regulator for producing accurately controlled taper rolled material.

It is also an object of our invention to provide in a control system for a rolling mill, for controlling the operating relations of screw-down and roll motors of the mill for taper rolling, by controlling the relative speeds of the motors in accordance with a predetermined ratio for a given desired taper, and modifying such control in accordance with the rate of deformation of the mill housing while rolling.

It is an important object of our invention to provide for selectively controlling the operating relations of roll and screw-down motors of a rolling mill for either flat or taper rolling, and either manual or automatic control of the taper.

Yet another object of our invention is to provide for automatically selecting different operating speeds for the roll motor of a rolling mill in accordance with the maximum operating conditions of the screw-down motor for different values of taper to be imparted to materials being rolled.

Another important object of our invention is to provide in a rolling mill screw-down control system, for producing an electrical quantity in response to deformation of the mill housing, using such quantity to control the output of a magnetic amplifier which reversibly controls the phase of an alternating current voltage applied to a servomotor, and applying to the magnetic amplifier a feedback quantity integrated from the amplifier output.

Yet another of the important objects of our invention is to provide for producing longitudinally tapered material in a rolling mill by controlling the operation of a screw-down motor for the mill in accordance with the speed of the mill and error in the profile of the material, as determined from the speed of the mill and the roll position.

It is also an important object of our invention to provide for simultaneously matching portions of speed-responsive voltages of the screw-down and roll motors of a rolling mill for controlling the speed of the screw-down motor to provide different taper rates, matching the angular position of the screw-down motor shaft against a theoretical position, as determined from the particular taper rate and the angular position of the roll motor shaft, producing a voltage in accordance with deformation of the mill housing, differentiating the voltage and using it as a corrective factor for determining error in the actual taper rate, and applying the deformation responsive voltage as a corrective factor in determining error in relative shaft positions.

Other objects will, in part, be obvious, and will, in part, be explained hereinafter.

In rolling a sheet or strip of material which is tapered in the direction of rolling, the thickness of the sheet at any vertical section may be represented by the equation $Y = \alpha x + Y_0$, where $\alpha$ is the taper rate and $x$ is the longitudinal distance along the longitudinal axis of the material in the direction of rolling of the particular section from a reference section having a thickness $Y_0$. Since changes in $\alpha$ may be cumulative, control of the taper rate must either be exceedingly close, or the actual profile of the sheet may vary considerably from the values determined from this equation. Control of taper rate alone is, therefore, only a part of the problem and consideration should also be given to control the profile.

By differentiating the above equation, it will be seen that the taper rate $$\alpha = \frac{dy}{dt} \Big/ \frac{dx}{dt}$$

so that the taper rate may be regulated by controlling the speed of the screw-down motor relative to that of the mill motor, since $dy/dt$ depends on the speed of the screwdown motor, and $dx/dt$ depends on the speed of the roll motor. Since the mill housing is deformed during rolling, and acts much like a spring, the distortion will be substantially proportional to the force as in the case of a spring, and hence the actual thickness $Y_a$ of the sheet will depart from that indicated by the screw-down motor position according to the equation $$Y_a = Y' + \frac{F}{M}$$

where $Y'$ is the roll separation as determined from the setting or position of the mill screwdown, $F$ is the load on the mill housing, and $M$ is the modulus of elasticity of the housing. Since the sheet when being rolled is squeezed out between the rolls forward speed of the sheet as it comes out of the mill differs from the peripheral roll speed by the slip between the sheet and roll, its relation to the roll speed may be expressed by the equation $$\frac{dx}{dt} = (1+f)V$$

where $V$ is the peripheral roll speed, and $f$ is the forward slip of the sheet relative to the roll, the taper rate $\alpha$ may be represented by $$\frac{\frac{dy'}{dt} + \frac{1}{M}\frac{dF}{dt}}{(1+f)V}$$

Now since $Y = \alpha x + Y_0$, and $$\frac{dx}{dt} = (1+f)V$$

if $x=0$ at $t=0$, $x = \int(1+f)V dt$, and $$Y - Y_0 = \alpha(1+f)\int V dt$$

Taper rate control is effected by taking the speed of the screw-down motor as measured by a pilot generator driven by the screw-down motor, compensating for the deformation rate of the mill housing by means of a servo system controlled by strain gauges on the mill housing, and matching the resultant against the speed of the mill, as determined by a pilot generator driven by the mill, through a voltage divider adjusted in accordance with the desired taper rate, and using the differential as a corrective quantity to regulate the speed of the screw-down motor.

Profile or thickness control may be effected by measuring the position of the screwdown, which gives an indication of roll separation and hence material thickness at any instant by means of a selsyn device, matching it against the desired roll position for the desired profile, as determined from the shaft position of a velocity servo driven from the mill pilot generator through a voltage divider adjusted in accordance with the taper rate, obtaining a differential therefrom, compensating for the mill housing deformation, and using the resultant error in roll position to control the screw-down motor to correct for such error.

By using both types of control, both taper rate and profile control, each serves to regulate the other, and benefits of each may be obtained using each to neutralize the usual disadvantages of the other. Either type of control may be made to predominate by increasing the amplification thereof relative to the other, so that the other acts as a feedback or control quantity.

In practicing our invention in accordance with one of its forms, the relative speeds of the roll and screwdown motors of a mill are controlled so as to produce sheet tapered in the direction of rolling. The speed of the screw-down motor of the rolling mill is regulated in accordance with the speed of the mill by matching a portion of the voltage of a pilot generator driven by the screw-down motor with a portion of the voltage of a pilot generator driven by the roll motor through an adjustable impedance network, which is adjusted to different settings for different desired rates of taper. The differential between the pilot generator voltages is applied to a regulator for controlling the speed of the screw-down motor. A strain gauge is mounted on the mill housing and is used to drive a servo system which has an output proportional to the rate of deformation of the housing while rolling, and this quantity is also applied to the screw-down regulator to compensate for differences between the actual screw-down speed and the rate of change of roll position due to housing deformation. A selsyn device driven by the screw-down motor measures the screw-down position, and this is matched against the theoretical position of the rolls as measured from a velocity servo system responsive to the mill pilot generator output, through a differential device. Compensation is provided for the effects of mill housing deformation from the strain gauge servo system, and a position error quantity is applied to the screw-down regulator to assist in maintaining the correct profile of the material.

For a more complete understanding of the nature and scope of our invention, reference may be made to the following detailed description and to the accompanying drawings, in which:

FIGURES 1A and 1B taken together show a schematic diagram of a taper rolling mill control system embodying the invention in one of its forms;

FIG. 3 is a chart showing the relative positions of FIGS. 4A, 4B, 4C, 4D, 4E, 4F, 4G, and 4H; and FIGS. 4A through 4H taken together are a detailed diagram of the taper rolling mill control system shown schematically in FIGS. 1A and 1B.

Figure 1A:
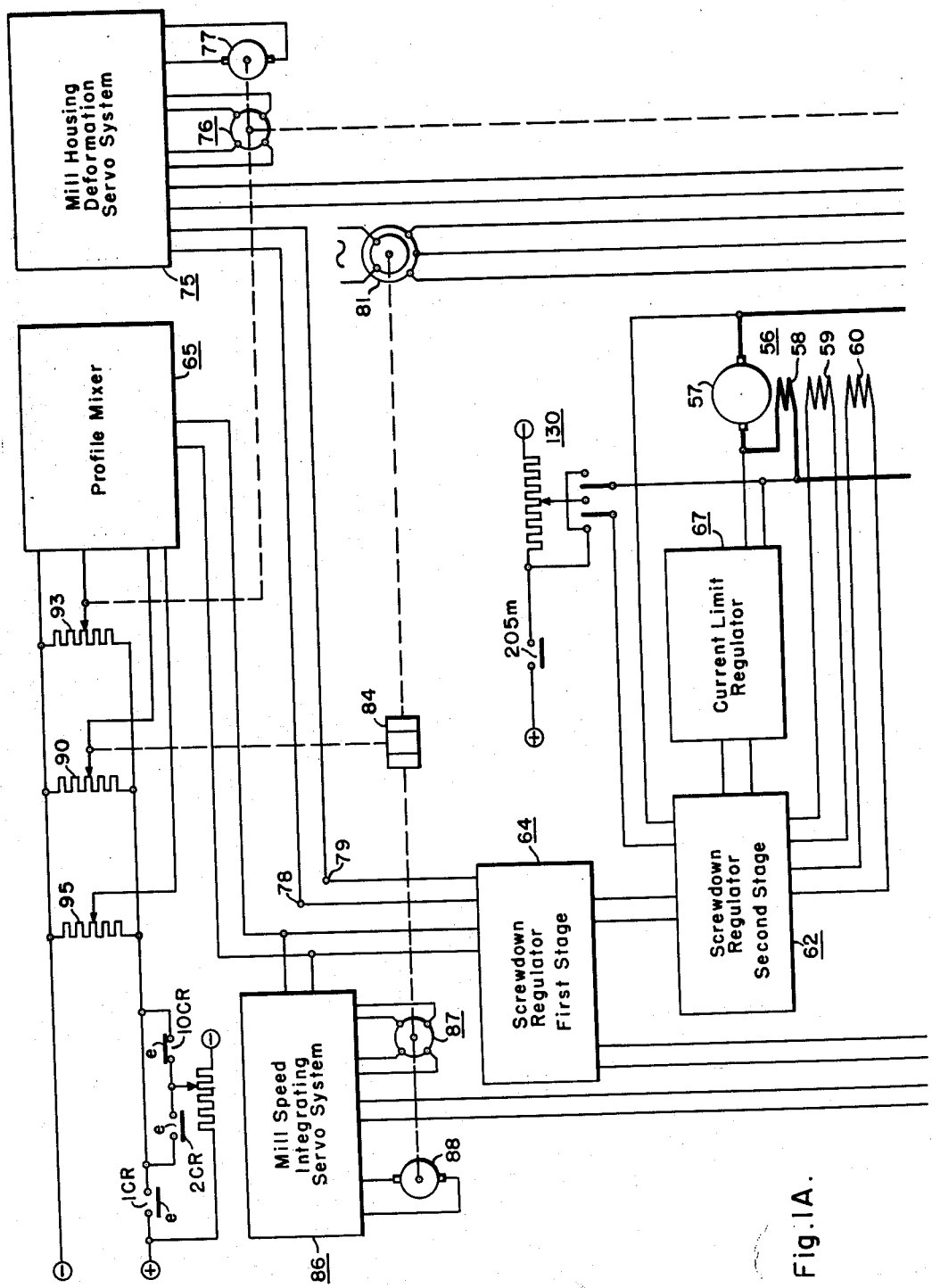

Referring to FIGS. 1A and 1B, the reference numeral 10 denotes a mill housing shown in end elevation for purposes of simplification, and having upper and lower rolls 11 and 12 for rolling a strip or sheet of material m. The lower roll 12 is relatively fixed in the housing 10, while the upper roll 11 is slidably mounted, and is raised or lowered in the housing for varying the spacing between the rolls 11 and 12. The rolls 11 and 12 are provided with backup rolls 13 and 14, in the usual manner, and screw-down means represented by the threaded shaft 15 are provided for moving the upper roll 11 relative to the lower roll 12. The rolls 11 and 12 are driven by means of a roll motor 18 which for purposes of simplification is shown as connected to the roll 12 only, and having an armature 19 and main and series field windings 20 and 21, respectively. A pilot generator 22 is connected to the armature 19 of the roll motor for producing a voltage in accordance with the speed of the roll motor.

The field winding 20 is energized from an exciter 24 having an armature 25 and field windings 26 and 27 disposed to be selectively energized in opposite senses through a regulator 30 for controlling the value and direction of excitation of the field winding 20. The armature 19 of the roll motor 18 is energized from a main generator 32 having an armature 33 connected in circuit with the armature 19 of the motor and provided with main and series field windings 35 and 36, respectively. The field winding 35 is energized from a generator exciter 38 having an armature 39 and field windings 40 and 41 disposed to be selectively energized in opposite senses from a generator voltage regulator 44. A reference exciter 46 having an armature 47 having differential and main field windings 48 and 49, respectively, controls the output of the regulator 44. A motor-operated rheostat 50 controls the value and direction of energization of the main field winding 49, and also controls the energization of the field windings 26 and 27 of the motor exciter through the regulator 30.

The screw-down shaft 15 is operated by a screw-down motor 52 having an armature 53 and a field winding 54. The screw-down motor is energized from a generator 56 having an armature 57, a series field winding 58, and field windings 59 and 60 disposed to be selectively energized in opposite senses from the second stage 62 of a screw-down velocity and position regulator. The input to the second stage of the screw-down regulator is provided from a first stage screw-down regulator 64, which is responsive to profile error as determined by a profile mixer 65, mill housing deformation rate as determined by a mill housing deformation servo system 75, and error in the taper rate, as determined by a speed differential circuit 66 which is subject to predetermined portions of the output voltages from the pilot generator 22 of the roll motor, and a pilot generator 68 having an armature 69 driven by the screw-down motor. A current limit regulator 67 responsive to the armature current of the screw-down motor 52 modifies the control of the first stage regulator 64.

In order to correct error in the taper rate for variations due to deformation of the mill housing 10 while rolling, a strain gauge circuit comprising a strain gauge element 70 having relatively movable parts and a strain gauge element 72 having relatively fixed parts mounted on the mill housing, is used to operate a mill housing deformation servo system 75 having a servomotor 76 which drives a tachometer 77 to produce an output in accordance with the rate of deformation of the mill housing. This quantity is applied to the first stage 64 at the terminals 78 and 79.

Profile control is effected by using a selsyn system comprising a transmitter 80 and a receiver 81 connected to the screw-down motor 52 for operating into one side of a mechanical differential 84. A mill speed integrating servo system 86 having a servomotor 87 driving a tachometer generator 88 is used to drive the other side of the differential 84, in accordance with the theoretical position of the screw-down motor as determined from the speed of the mill, by means of the pilot generator 22 of the roll motor. The output of differential 84 is used to adjust a position error potentiometer 90 for applying a control quantity to a profile mixer 92 in accordance with the profile error, while a rate of deformation quantity is applied to the profile mixer by a rate potentiometer 93, which is actuated by the servomotor 76 of the deformation 75 in accordance with the rate of deformation of the mill housing. A potentiometer 95 is provided in circuit with the rate deformation potentiometer for calibrating the profile mixer for the zero or unloaded position of the mill rolls.

THEORY OF OPERATION

The objective of the control system is the production of hot or cold rolled material having a prescribed profile in the direction of rolling. The prescribed profile can be described best in mathematical terms. Adopting the notation, $x=$ The longitudinal or axial distance of a particular section of material, which section is perpendicular to the direction of rolling, from the entry end of the sheet having a length L.

$Y=$ The thickness of the material at a section which is at a distance $(x)$ from the entry end. It will be assumed here that at any particular section the thickness is uniform.

Both being measured after rolling, we have, $$Y = \alpha.x + Y_0 \quad (0 \leqslant x \leqslant L)$$

Now $Y_0$ is a constant and represents the thickness of the material at the entry end of the sheet which is identified by $x=0$. On the other hand and in the most general sense, $(\alpha)$ may be a function of $(x)$, but in the case of particular importance and the one which we shall consider here, $\alpha$ is a preassigned constant within some fixed range $0 \leqslant \alpha \leqslant \alpha_0$. Since in this event, for the prescribed profile, $$\frac{dy}{dx} = \alpha$$

the factor $(\alpha)$ is referred to as the taper rate.

It should be emphasized that the objective of the control system is the production of material having, say, the prescribed profile $$Y = \alpha x + Y_0 \quad (0 \leqslant x \leqslant L)$$

It cannot be expected that this prescribed profile will be obtained in practice unless the process is forced to do so, and it must be anticipated even then that the profile actually obtained will only approximate that prescribed. The profile actually obtained, then, will be described by the equation, $$Y_a = \int_0^x \alpha_a(x)dx + Y_{oa} \quad (0 \leqslant x \leqslant L)$$

since, in general, the actual taper rate $\alpha_a$ will be a function of $(x)$. Therefore, the control system must function to produce an actual profile $(Y_a)$ which approximates under some criterion the prescribed profile $(Y)$. A number of criteria could be used for this purpose. For example, it might be required to maintain the thickness deviation within fixed limits, $$Y - s \leqslant Y_a \leqslant Y + s \quad (0 \leqslant x \leqslant L)$$

or perhaps within proportional limits $$Y(1-\beta) \leqslant Y_a \leqslant Y(1+\beta) \quad (0 \leqslant x \leqslant L)$$

where the quantities $s$ and $\beta$ are numbers establishing the permissible limits of variation in thickness from Y. These are the simplest criteria to apply in practice, sample checks being made at a number of sections selected (at random) along the length (L). A more useful criterion analytically is one imposing a limitation on the root mean square deviation of the thickness, which is expressed by the expression:

$$(1) \quad \sqrt{\frac{1}{L}\int_0^L (Y_a - Y)^2 dx}$$

expressed as a per-unit of the mean thickness.

By any of these criteria, the thickness of the material as it leaves the mill, $$(2) \quad Y_a = \int_0^L \alpha(x)dx + Y_0$$

must very nearly equal the reference thickness, $$(3) \quad Y = \alpha.x + Y_0$$

Now if $Y_0 = Y_{oa}$ and $\alpha_a(x) = \alpha$ identically, then $Y = Y_a$ for all values of $x$, and the expressed objective would be attained. The control of the taper rate $\alpha_a(x)$ would seem to be an indirect way of controlling the profile $(Y_a)$. At the same time, the control of the taper rate would appear simpler than the direct control of the profile. The accuracy requirements imposed on the control of the taper rate must necessarily be more stringent than those imposed on the direct control of the profile. Suppose that it were possible to control the average taper rate exactly but that the actual taper rate oscillates with an amplitude $(\Delta)$ about this average. It is conceivable that such a situation might actually arise in practice as a result, say, of variations in system parameters. Let, $$(4) \quad \alpha_a(x) = \alpha + \Delta \sin \frac{\pi n x}{L}$$

where $(n)$ can be any positive integer. The average value of $\alpha_a(x)$ is clearly, $$\frac{1}{L}\int_0^L \alpha_a(x)dx = \alpha$$

The RMS deviation resulting from the imposed variation of the taper rate is found from substituting in the Equation 1 the values of Y and $Y_a$ from Equations 2, 3, and 4, squaring and simplifying the value $$\sqrt{\frac{1}{L}\int_0^L \Delta^2 x^2 \sin^2 \frac{\pi n x}{L} dx} = \frac{L\Delta}{\sqrt{6}}$$

This is equivalent to a constant deviation of exactly $L\Delta/\sqrt{6}$. The conclusion to be drawn here is that the average taper rate may correspond to the desired taper rate exactly, but the profile, under any of the criteria established, may be unsatisfactory. Because of the finite response time of any realizable taper rate control system, it is only possible, in a strict sense, to control the average taper rate. The system proposed here will involve, more or less, direct control of the profile. Strictly speaking, direct control of the profile would imply a direct measurement both in time and magnitude of the thickness of the material as it leaves the mill. It is proposed to measure this thickness in the following way. The thickness of the material as produced by the mill depends primarily on two factors. These are, (1) The separation of the rolls assuming the mill to be empty.
(2) The roll force produced by the material being rolled and its effect on increasing the separation of the rolls because of the elasticity of the mill structure.

The roll separation, assuming the mill to be empty, can be measured by any conventional means based on the angular position of the mill screws. This component of total roll separation will be designated by the symbol $Y'$. The mill acts very much as a spring, so that any increase in roll separation as a result of the material being rolled is very nearly directly proportional to the roll force. The roll force can be measured by any conventional means. This will be discussed in more detail later. Thus if this increase in separation is denoted by the symbol $(Y'')$ and the roll force by the symbol $(F)$, the well known formula for springs may be followed, so that $$Y'' = M.F$$

where M is the factor of proportionality which can be termed the coefficient of mill elasticity. It is best determined experimentally. The thickness of the material as it leaves the roll gap is given, therefore, by $$(Y_a = Y' + Y'' = Y' + MF)$$

The thickness ($Y_a$) is controlled by varying the roll separation ($Y'$) by means of motors coupled to the mill screwdowns in the conventional manner. In the system proposed here, the quantity, $$K_1 Y_a + K_2 \frac{dy_a}{dt}$$

will be compared with the reference quantity, $$K_1 Y + K_2 \frac{dy}{dt}$$

continuously, the difference between these quantities being amplified and used to control the motors driving the mill screws and, therefore, the roll separation component ($Y'$) in order to reduce this difference very nearly to zero. The factors $K_1$ and $K_2$ are constants which can be considered to satisfy the inequalities, $0 \leq K_1 \leq 1$ and $0 \leq K_2 \leq 1$. If $K_1 = 0$ and $K_2 = 1$, the system would be a pure taper rate controller whereas if $K_1 = 1$ and $K_2 = 0$, the system would be a pure profile controller. In general, neither of these constants will be zero in the system being proposed, as certain advantages would otherwise be lost. Their relative order of magnitude need not be considered fixed, as this is more or less an operational adjustment for optimum performance.

The actuating quantity of the control system is, $$A = K_1 Y + K_2 \frac{dy}{dt} - K_1 Y_a - K_2 \frac{dy_a}{dt}$$

It will be convenient to decompose this quantity into two components, $$A_1 = K_1(Y - Y_a)$$

and, $$A_2 = K_2 \left( \frac{dy}{dt} - \frac{dy_a}{dt} \right)$$

The fact that A is small implies that the components $A_1$ and $A_2$ will also be small. If this were not true, then $A_1$ and $A_2$ would necessarily be of opposite sign and this is an unstable situation. Thus if the taper being produced is positive (increasing thickness) and if $A_2$ were negative, this would mean that, $$\frac{dy_a}{dt} > \frac{dy}{dt} = \alpha \frac{dx}{dt}$$

or, $$\alpha_a(x) > \alpha$$

since the actual taper rate is given by, $$\alpha_a(x) = \frac{dy_a}{dx} = \frac{\frac{dy_a}{dt}}{\frac{dx}{dt}}$$

This would mean that the actual thickness ($Y_a$) would (eventually) exceed that prescribed (Y) and, therefore, that ($A_1$) would also have to be negative. Similar behavior results for the other possible cases. Thus, when (A) and, therefore, ($A_1$) and ($A_2$) are small, $$Y_a(x) \approx Y(x)$$

and $\alpha_a(x) \approx \alpha$. We may think of ($A_1$) as being the profile actuating quantity and ($A_2$) as the taper rate actuating quantity. From our previous considerations, $$A_1 = K_1(\alpha x + Y_0 - Y' - MF)$$

and $$A_2 = K_2 \left( \alpha \frac{dx}{dt} - \frac{dy'}{dt} \right) - M \frac{dF}{dt}$$

Figure 2:
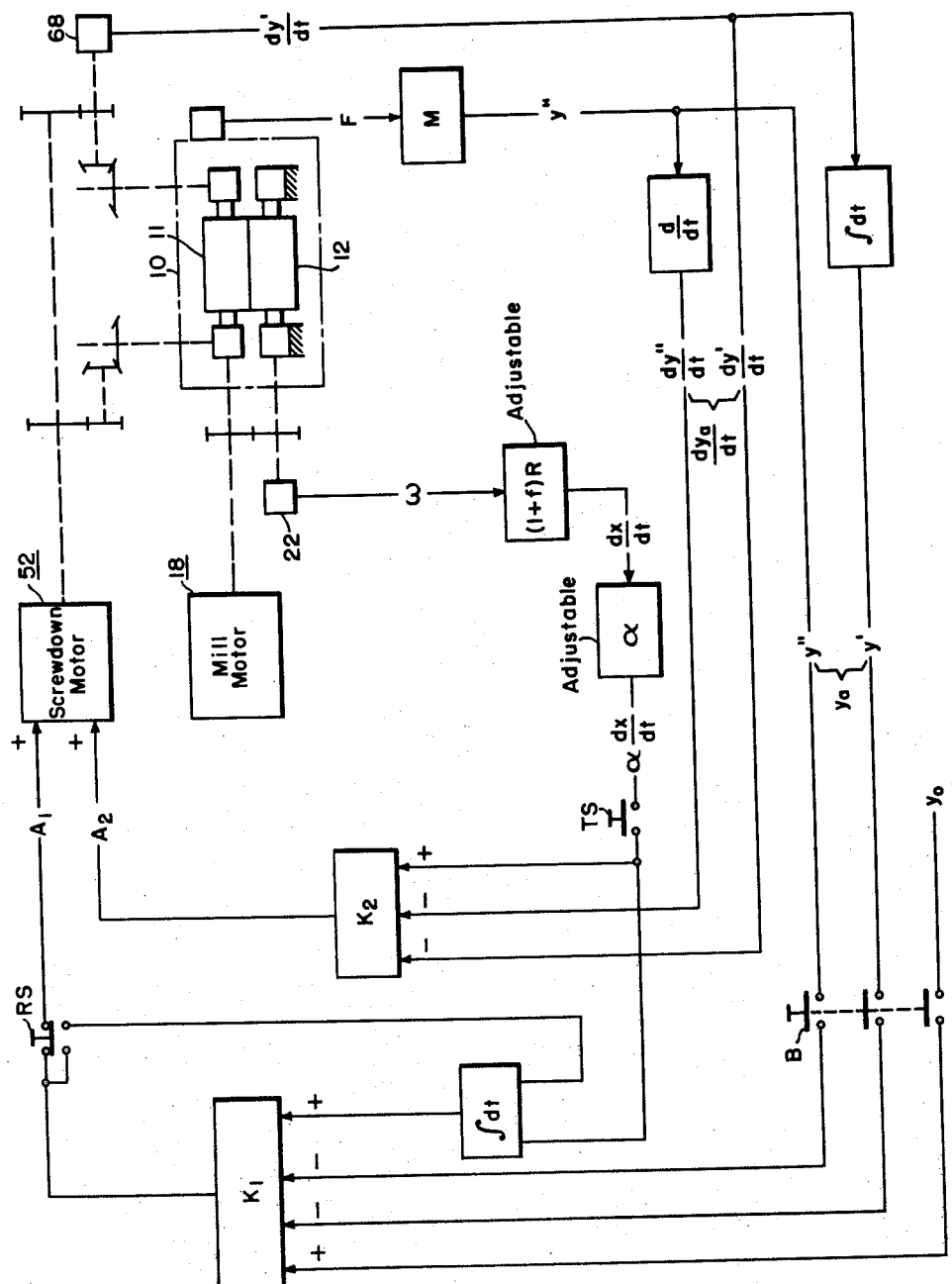
FIG. 2 is a schematic functional diagram of the control system showing the source and relationship of the controlled quantities.

We have previously discussed the measurement of ($Y'$) and (F). Since ($\alpha$) and (M) are constant multiplying factors which are either given or known, only (x) and ($Y_0$) remain to be determined. With only small inaccuracy, we may assume that the velocity ($dx/dt$) with which the material leaves the mill is proportional to the peripheral velocity (RW) of the mill rolls where (R) is the radius and (A) the angular velocity of the rolls. Thus $$\frac{dx}{dt} = (1 + f) RW$$

where the factor (f) is called the forward slip and which we assume to be constant for some range of rolling conditions. It must be determined experimentally. The angular velocity can be determined and an integration performed to obtain (x) by conventional means. This is true of all of the indicated operations such as multiplication, differentiation, and so forth. Only the intitial conditions remain to be established. These include the provision of the proper initial value of the thickness ($Y_0$) and the proper initial value of (x) which in all cases will be zero. A purely functional diagram of the system patterned after, but not identical with the system of FIG. 4, is shown in FIG. 2 of the drawing. Initially, relay RS (reset) is picked up and relays TS (taper start) and B are dropped out. With relay RS up, a negative feedback is provided to the input of the mill speed integrator ($\int dt$) which forces the output of this integrator, which is the quantity (x), to zero. This establishes the proper initial value for (x). Now with relay B dropped out, the roll separation ($Y'$) may be adjusted manually, by means not shown, to obtain the approximate required initial value. With the mill running at threading speed, relay RS is dropped out, relay B is picked up and the sheet is fed into the mill. The actuating quantity ($A_1$) will then vary the roll position ($Y'$) until the thickness of the sheet as it leaves the mill is equal to the required value ($Y_0$). During this period, the quantity (x) remains zero and the actuating quantity ($A_2$) functions only to stabilize the system. Depending on direct measurements, the quantity ($Y_0$), which is manually set, may be trimmed. Following the establishment of the initial conditions as described above, the taper rate setting ($\alpha$) is made and relay TS is closed, initiating the taper operation. The mill can then be accelerated to running speed.

In order to simplify the discussion, we have considered only one mode of operation. By means of directional contactors to provide the proper polarities, positive or negative tapers can be produced with the mill operating in either the forward or reverse directions.

Alternatively to the automatic provision of the proper initial thickness ($Y_0$), this can be done entirely manually by omitting the reference quantity ($Y_0$), and relay B. Picking up relay RS now provides a feedback to the integrator which reduces the signal $A_1$ to zero by matching the output of the integrator with the signals $Y'$ and $Y''$. With the omission of the automatic setting of the screws, which must be done entirely by manual means, the procedure otherwise follows that given above. In the detailed description that follows, this alternative procedure, in its essentials, will be followed. It is illustrative only, however, and is not to be taken in a limiting sense.

*Measurement of System Variables*

In the preceding section, we have outlined the basic theory of operation. We now proceed to describe one way in which such a system may be constructed by first considering the measurement of the system variables.

The roll separation ($Y'$) is directly dependent on the angular position of the shaft of the motor or motors driving the mill screw-downs, since the bottom roll remains in a fixed position and the top roll moves with the mill screws. This shaft position will be monitored at a remote location by means of a synchro-tie system. The shaft position corresponding to zero roll separation will depend on roll diameter and bottom roll position so that if these are changed the calibration of shaft position must be changed accordingly. Recalibration is done automatically during the establishment of the proper initial conditions.

The rate of change of roll separation $(dy'/dt)$ is measured by means of a tachometer coupled to the screw-down motor and which provides an electrical voltage proportional to this rate of change.

The angular velocity of the mill rolls is measured by means of a tachometer coupled to the mill motor and which provides an electrical voltage proportional to this velocity.

The roll force is measured by means of magnetic variable reluctance strain gauge which is mounted on the mill housing. The fixed and movable coils of this gauge are arranged in a bridge circuit with a variac. The input of this bridge is connected to a fixed voltage A.-C. power supply. The output of the bridge is fed to the input of a servo amplifier which supplies power to a servo motor. This drives the variac in the bridge circuit in such a direction as to keep the bridge balanced. The shaft position of the servo motor is, therefore, directly proportional to the roll force (F) and, therefore, to the roll deflection $(Y'')$. A tachometer coupled to the servo motor provides an electrical voltage which is proportional to the rate of change of roll deflection $(dy''/dt)$. This voltage is also fed back to the input of the servo amplifier for servo stabilization. The shaft position corresponding to zero roll deflection will depend on mill housing temperature but recalibration is again accomplished during the establishment of the proper initial conditions.

Strictly speaking, the integration of $(dx/dt)$ to obtain $(x)$ is an operation and not a measurement, but it will be convenient to consider it as such. Now $(\omega)$ appears as a voltage, and multiplication by $(1+f)R$ to obtain $(dx/dt)$, and then by $(\alpha)$ to obtain $(\alpha dx/dt)$, will be performed by potentiometers. The voltage representing $(\alpha dx/dt)$ is fed to the input of a servo amplifier which supplies power to a servo motor. A tachometer is driven by the servo motor and its output voltage is fed back to the input of the servo amplifier to balance the first input. The angular velocity of the servo motor will be proportional to $(\alpha dx/dt)$, and the shaft position of the servo motor will, therefore, be proportional to $(\alpha x)$.

*Operations Performed on System Variables*

We now have $\alpha dx/dt$, $dy'/dt$, and $dy''/dt$ expressed as electrical voltages at relatively low power levels and $\alpha x$, $Y'$ and $Y''$ as shaft positions. Now $Y'$ is the quantity modified by the actuating quantities $A_1$ and $A_2$, by means of the screw-down motor. The screw-down motor is supplied with power from a variable voltage direct current generator, and the field excitation supplied to this generator is provided by power and voltage amplifiers. The output of these amplifiers is made proportional to the actuating quantity $(A=A_1+A_2)$. Only small changes in the actuating quantity is needed to effect relatively large changes in the angular position and velocity of the screw-down motor shaft and, therefore, in $Y'$ and $dy'/dt$. The actuating quantities $A_1$ and $A_2$ must be fed to the input of the voltage amplifier as electrical voltages. The quantities $\alpha dx/dt$, $dy'/dt$, and $dy''/dt$ which make up $A_2$ are fed, more or less separately and directly, each in the correct polarity, to the input of the voltage amplifier. The quantities $\alpha x$, $Y'$ and $Y''$ which make up $A_1$, and which are represented by shaft positions, must first be converted into electrical form. This will be done by means of potentiometers actuated by these shafts and supplied from a common constant voltage source to minimize the effect of any voltage drift of this source. The output of these potentiometers, which are correctly proportioned, are fed to separate and isolated inputs of a separate voltage amplifier called the "profile mixer" which provides the proper polarity reversals and magnitude changes so that its output represents $A_1$ in voltage form. This voltage is fed to the input of the voltage amplifier supplying the screw-down generator. In each case, the amplifiers sum, algebraically, the inputs supplied. Now the above potentiometers have only limited travel and $\alpha x$ and $Y'$ are quantities which may exceed their normal operating range. For this reason, it is desirable to subtract the shaft positions representing these quantities by means of a differential gear unit before conversion into electrical form by means of a potentiometer. The feedback provided from the output of the profile mixer to the input of the servo integrator can then balance, when relay RS is closed, referring to the previous figure, large excursions of these quantities at no expense to potentiometer range.

Figure 4C:
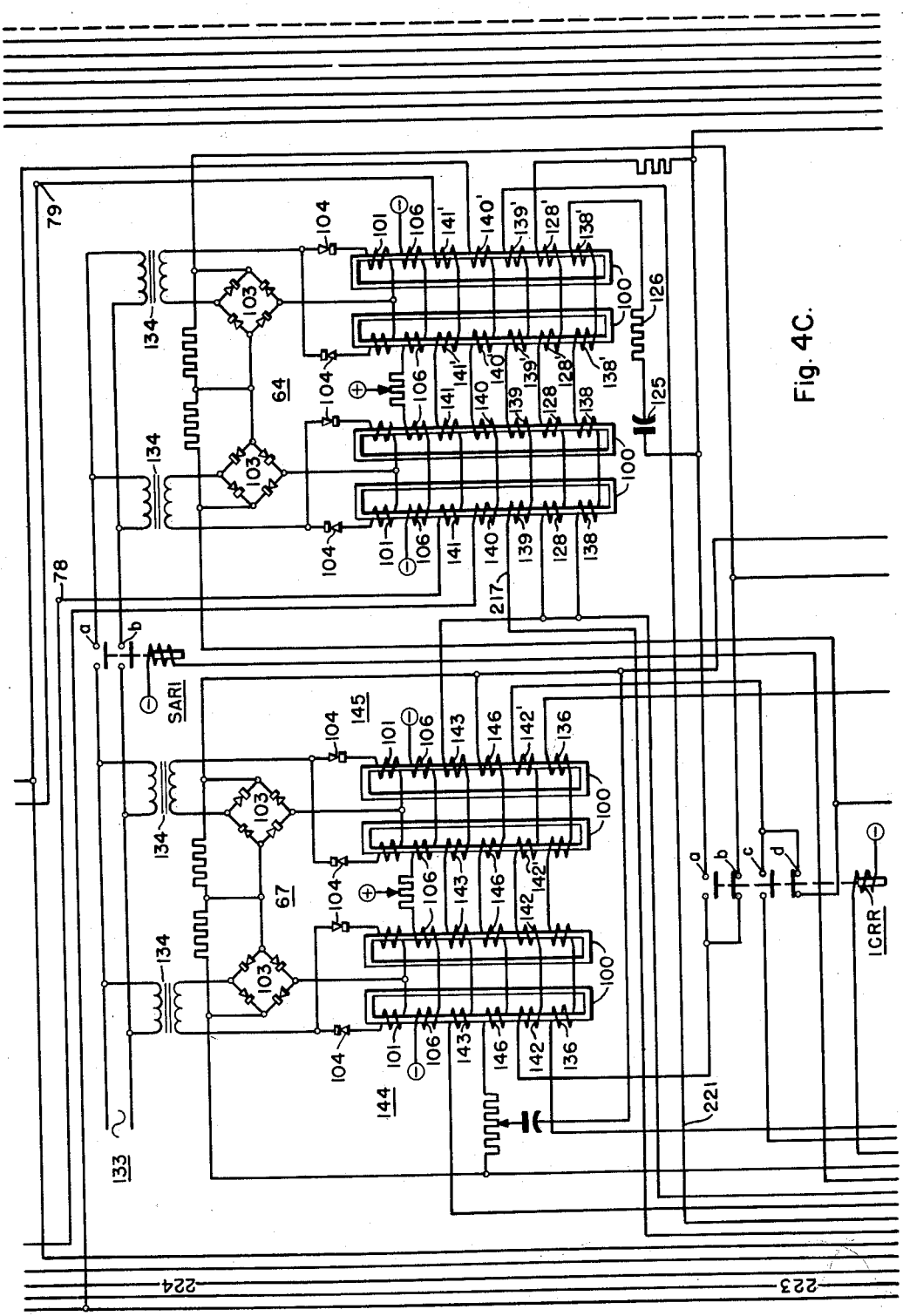
Figure 4D:
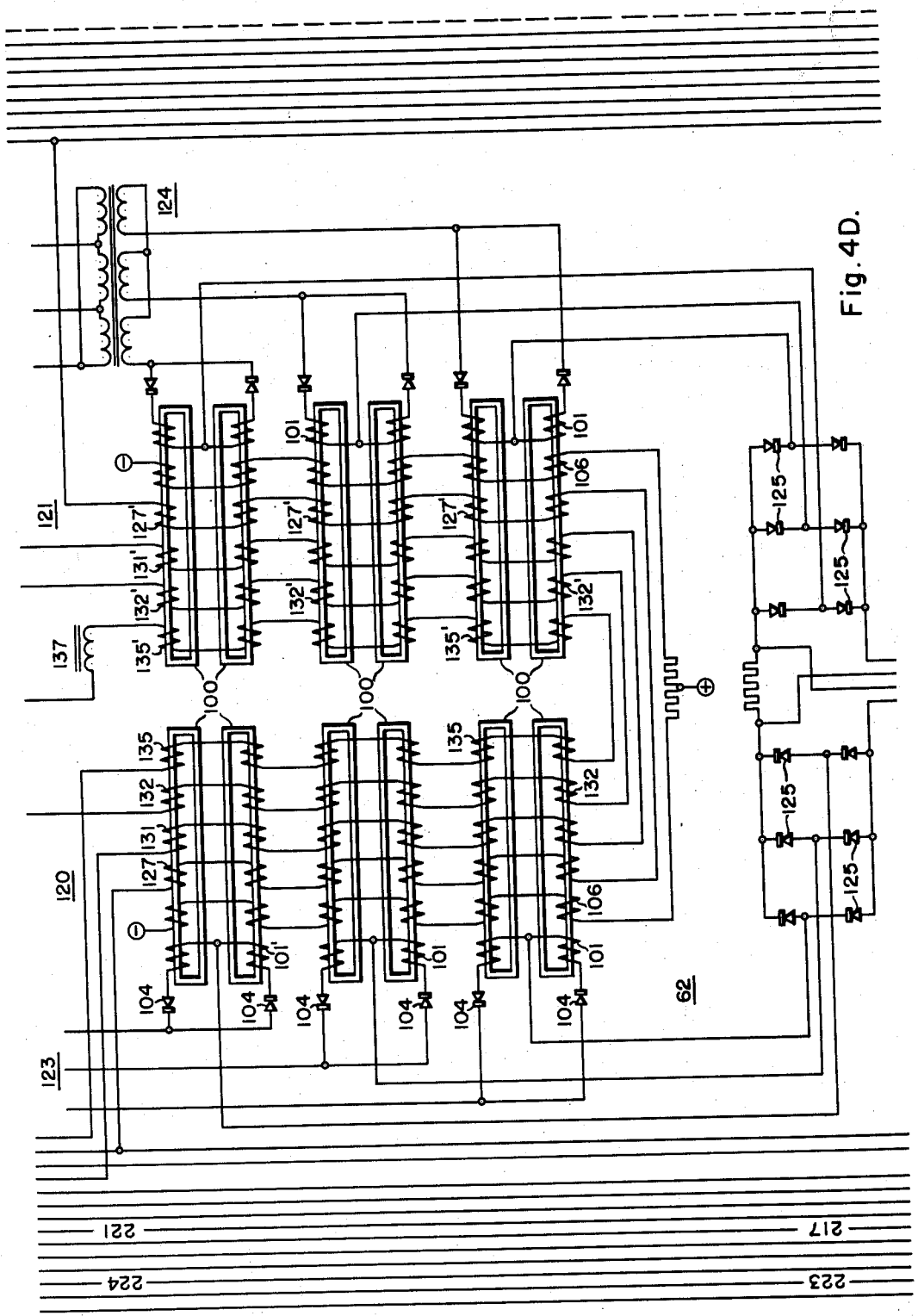
Figure 4E:
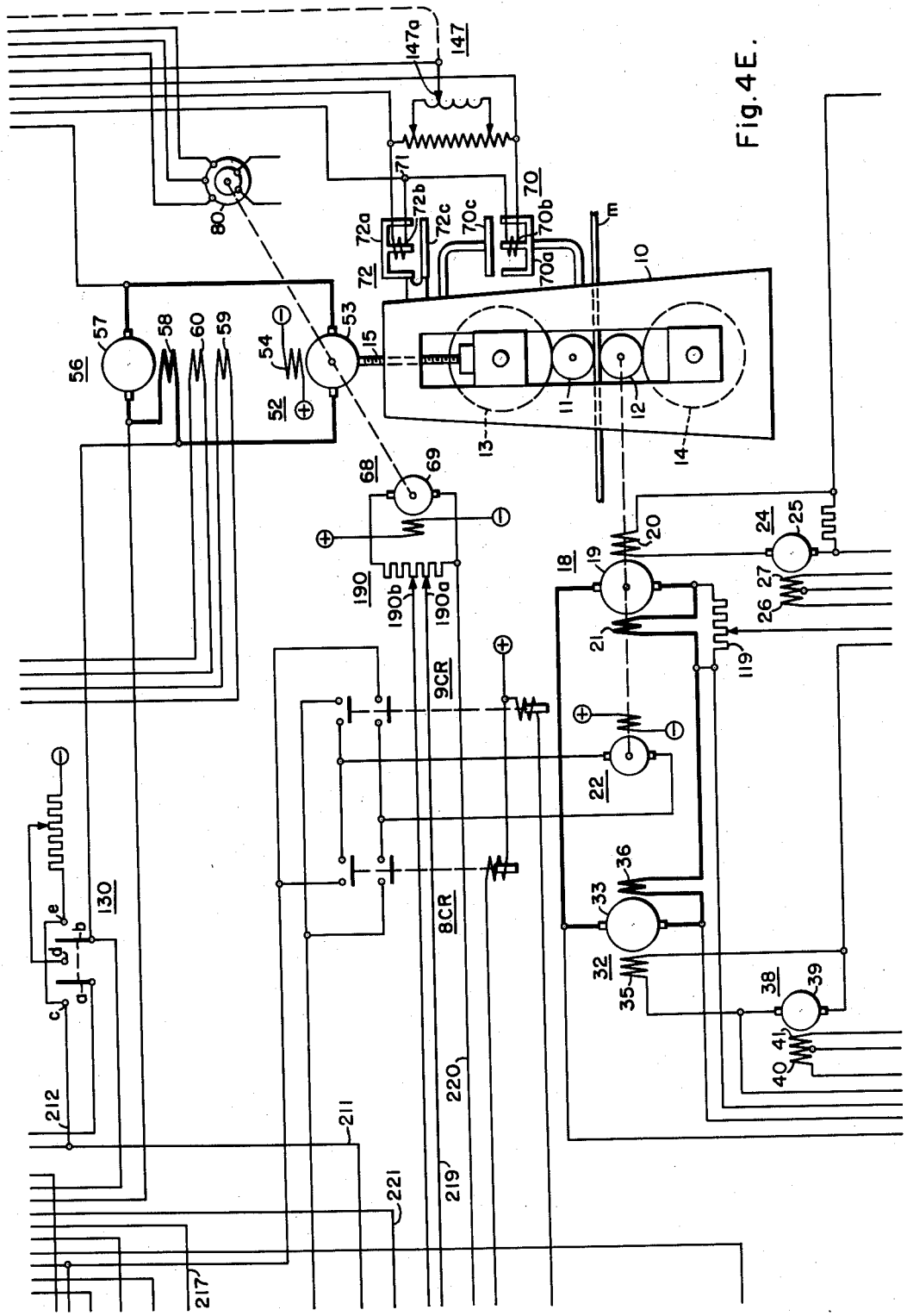
Figure 4F:
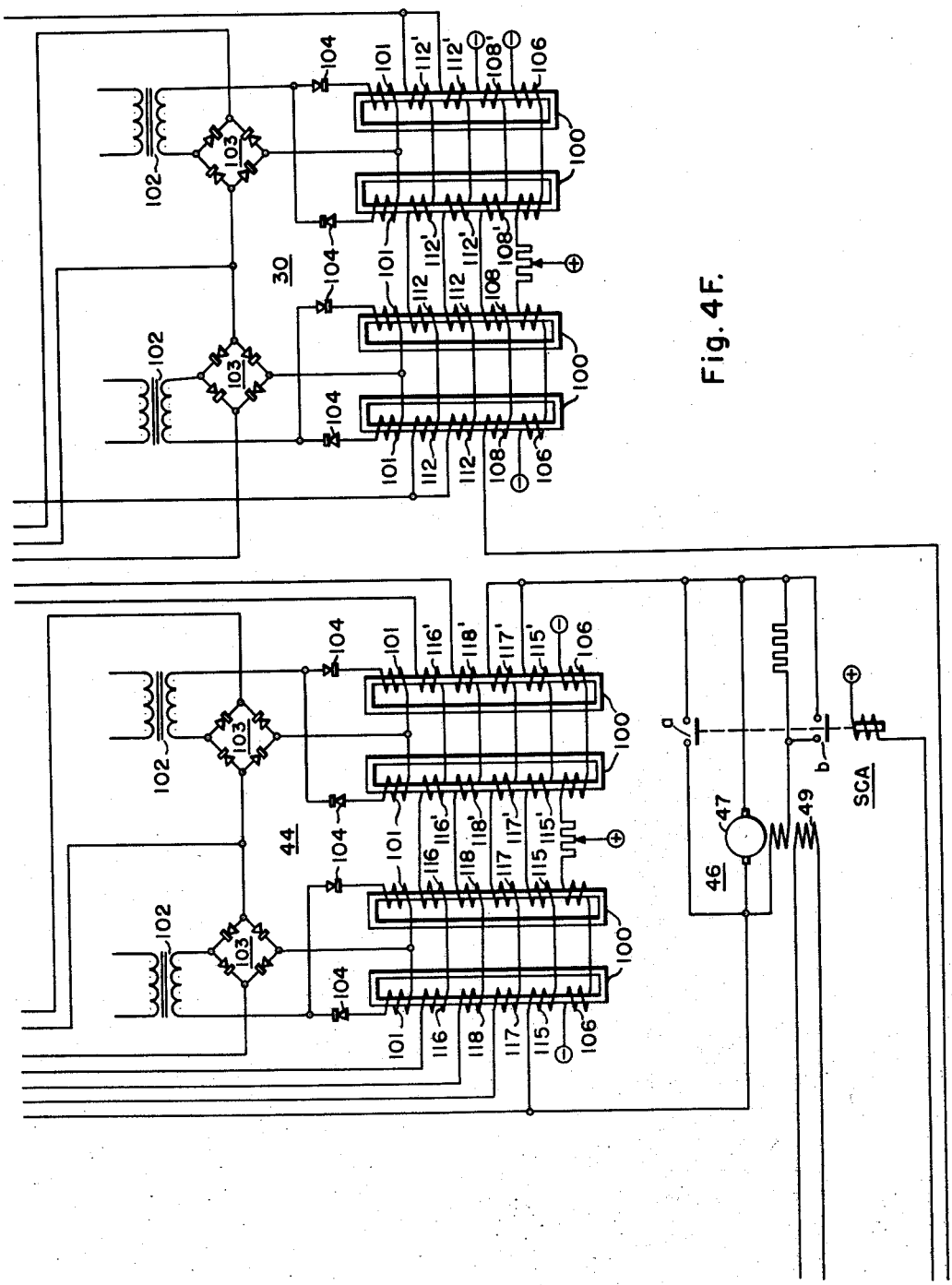
Figure 4G:
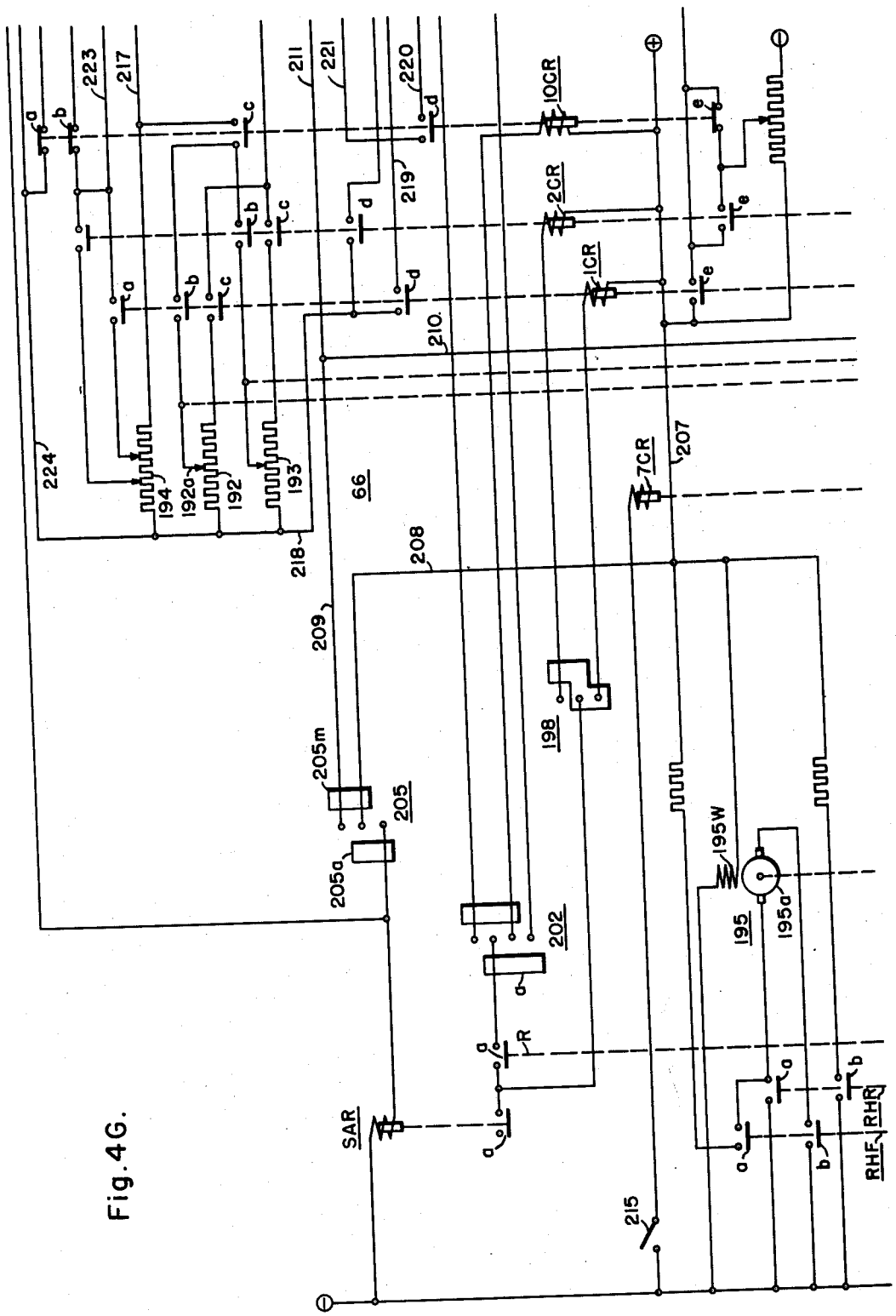
Figure 4H:
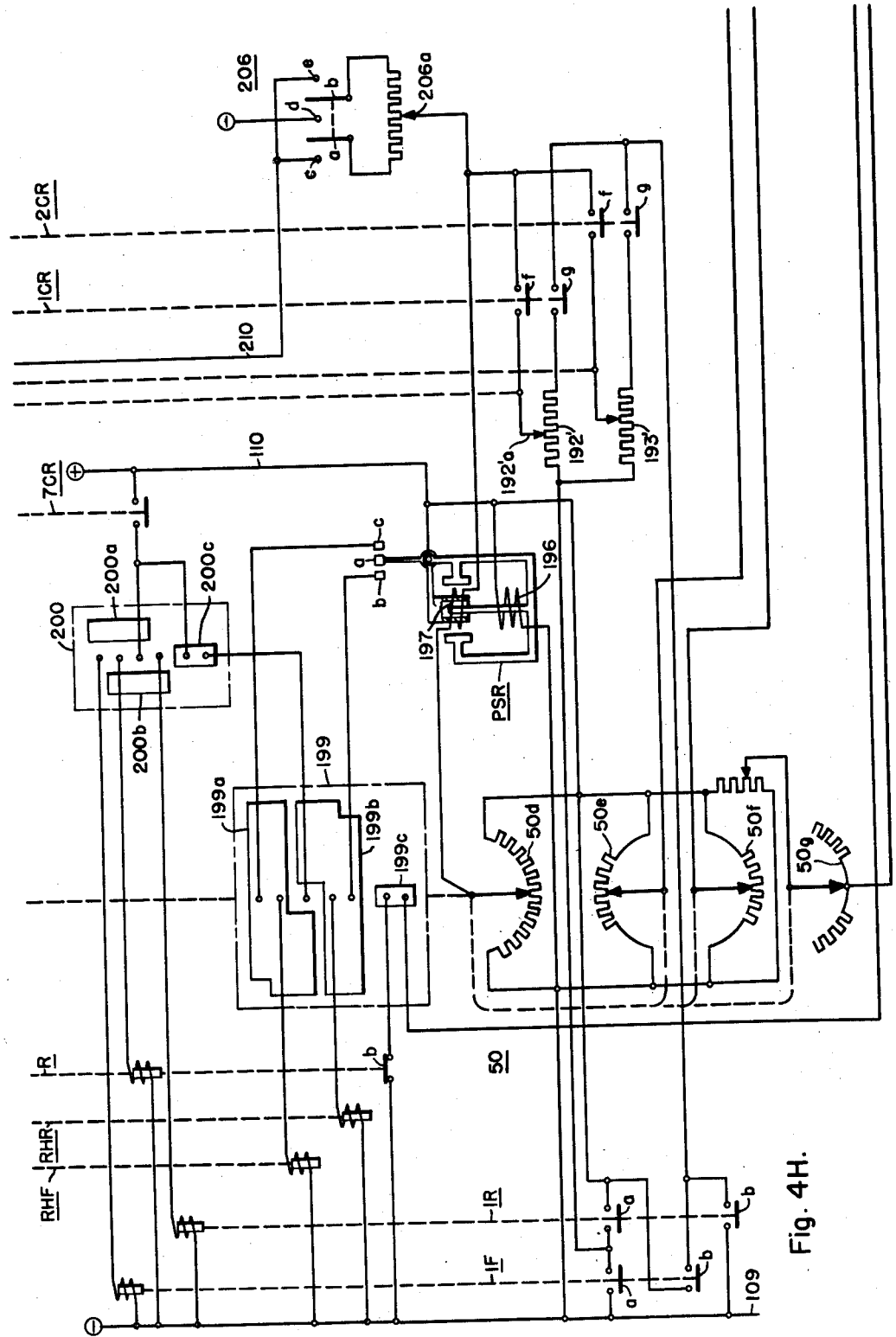

Referring to FIG. 4F, it will be seen that roll motor field regulator 30 comprises a reversible magnetic amplifier having a plurality of magnetic cores 100 which are arranged in pairs and are provided with load windings 101. The load windings of each pair of cores are connected to an alternating current source through transformers 102 for selectively energizing one or the other of the field windings 26 and 27 of the roll motor exciter 24 in opposite senses through rectifier bridge circuits 103 which are oppositely disposed. The load windings 101 of the magnetic cores 100 of each pair are essentially connected in parallel with oppositely disposed rectifier devices 104 in circuit therewith, so as to be energized on opposite halves of the voltage wave. The cores 100 are provided with bias windings 106 which are differential with respect to the load windings. Pattern windings 108 and 108' are provided which are respectively cumulative and differential with respect to the respective load windings and are connected to be variably energized from a source of control voltage represented by the conductors 109 and 110 through a movable contact arm 50g of a motor-operated rheostat 50 shown on FIG. 4H, for varying energization of the field windings 26 or 27 so as to bring the motor 18 to full field before varying the speed by armature control through the generator 56. The pairs of cores 100 are also provided with control windings 112 and 112' energized differentially and cumulatively, respectively, from the armature 25 of the roll motor exciter 24 in accordance with the motor field current, so as to selectively effect energization of windings 26 and 27 in opposite senses for maintaining a predetermined value of motor field current. Accordingly, if the pattern windings predominate, the load windings of one pair conduct, and if the current windings predominate, the windings of the other pair conduct, and the windings 26 and 27 are selectively energized in opposite senses.

The generator voltage regulator 44 likewise comprises a reversible magnetic amplifier having a plurality of magnetic cores 100 arranged in pairs and having load windings 101 which are connected to an alternating current source through similar transformers 102 and opposing field windings 40 and 41 of the roll motor generator exciter 38 for selectively energizing them in opposite senses through rectifier bridge circuits 103. The load winding 101 of each pair of cores are arranged in parallel circuit arrangement with oppositely disposed rectifier devices 104 for effecting energization of the respective windings on opposite halves of the voltage wave. Each of the cores is provided with a differential bias winding 106. Cumulative and differential pattern windings 115 and 115' respectively are provided on the cores of the different pairs and which are connected across the armature 47 of the reference exciter 46. The main field winding 49 of the reference exciter is connected between movable contact arms 50e and 50f of oppositely disposed sections of the motor-operated field rheostat 50, so as to be energized in accordance with the positions of the rheostat arms. Differential and cumulative anti-hunt windings 116 and 116' are provided on each of the cores of the respective pairs and are connected across the armature 39 of the roll motor generator exciter. Error control windings 117 and 117' are provided on the cores in opposite senses for the different pairs and are connected across the armatures 47 and 39 of the reference exciter and the generator exciter, so as to be responsive to any differential between these two voltages. IR windings 118 and 118' are also provided on the cores being respectively connected across a portion of a resistor 119 shunting the series field winding 21 of the roll motor 18 in cumulative and differential relation with the load windings.

Referring to FIG. 4D, it will be seen that the second stage 62 of the two-stage screw-down regulator comprises a three-phase magnetic amplifier having forward and reverse sections 120 and 121, respectively, for selectively controlling the energization of the opposing main field windings 59 and 60 of the screw-down generator 46, to control both the direction and value of the output voltages of the screw-down generator. Both the forward and reverse sections of the regulator 62 comprise a plurality of magnetic cores 100 arranged in pairs, for example three such pairs each. Each pair of cores has a load winding 101, these windings being connected in parallel circuit relation with oppositely disposed rectifier devices 104 for supplying electrical energy from an alternating current source represented by the conductors 123 and the transformer 124, which may be energized from the same source, to the field windings 59 and 60 through full-wave circuits of rectifier devices 125. The cores 100 are provided with differential bias windings 106 connected to a suitable source of bias voltage, voltage windings 127 and 127' which are reversibly connected to a source of control voltage and to the armature 57 of the screw-down generator 56 through a manual screw-down control switch 130 for reversibly energizing these windings in accordance with any differential between the reference and armature voltages to manually operate the screw-down motor 56 to raise or lower the upper roll 11, so as to vary its position relative to the lower roll 12. Current limit windings 131 are provided on each of the cores, and are disposed to be selectively energized in opposite senses from the current limit regulator 67, so as to limit the maximum value of armature current of the screw-down motor 52. Control windings 132 and 132' are provided on each of the cores for reversible energization in accordance with the output voltage of the first stage screw-down regulator 64, being connected to an alternating current source 133 through control transformers 134, load windings 101 of the regulator 64, and rectifier bridge circuits 103. Damping windings 135 are provided on each of the cores and are connected in a closed circuit with corresponding damping winding 136 of the current limit regulator 67 through a reactor 137 to stabilize operation by minimizing overshoot during changes in flux in the cores.

Referring to FIG. 4C, it will be seen that the first stage 64 of the screw-down regulator comprises a plurality of magnetic cores 100 arranged in pairs and having load windings 101 connected in parallel circuit relation with oppositely disposed rectifier devices 104 for obtaining unidirectional energization of control windings 132 of the second stage 62 in opposite senses. Each of the cores is also provided with differential bias windings 106 connected to a suitable source. The cores are also provided with taper rate control windings 139 and 139' which are energized in opposite senses from the differential circuit 66 of FIG. 4G in accordance with a differential between the actual speeds of the roll and screw-down motors in a manner which will be explained hereinafter, so as to render either one section or the other conductive, depending on the direction of the error. Position error control windings 140 and 140' are provided on each of the cores which are selectively energized in opposite senses from the profile mixer circuit 65, as will be hereinafter explained. Deformation rate control windings 141 and 141' are provided on each of the cores and are energized reversibly in opposite senses in accordance with the output of the mill housing deformation servo system 75. Damping windings 138 and 138' are connected in circuit with a capacitor 125 and resistor 126 to oppose changes in output of the amplifier. Feedback windings 128 and 128' are provided differential and cumulative to their respective load windings.

The current limit regulator 67 comprises a reversible magnetic amplifier having two pairs of cores 100 of magnetic material arranged in pairs with load windings 101 thereon, the load windings of each pair being connected in parallel relation in series with oppositely disposed rectifier devices 104 for unidirectional energization from an alternating current source represented by control transformers 134. The windings 101 are connected in circuit with the input circuits of oppositely disposed rectifier bridge circuits 103, the output circuits of which are connected to the current limit windings 131 of the second stage 62 for selectively energizing them in opposite senses. Bias windings 106 are provided on the cores in opposition to the load windings. Voltage windings 142 and 142' are provided on the pairs of cores, being respectively differential and cumulative, while current windings 143 are respectively cumulative and differential on pairs 144 and 145. Voltage windings 142 and 142' are energized from the first stage 64 during automatic control, and from a control source during manual control through a control relay 1CRR. Feedback windings 146 are energized in accordance with the output of the current limit regulator in opposition to the load windings.

Referring to FIG. 4E, it will be seen that the one strain gauge element 70 comprises a core member 70a having a winding 70b thereon and provided with a shunt member 70c, both members being mounted on the housing at relatively widely-spaced points, so that deformation of the housing results in a relative change of position of the members 70c and 70a with a resultant change in the impedance of the winding 70b. The strain gauge element 72 comprises a similar arrangement of elements, except that the shunt member 72c is supported on the mill housing relatively close to the support of the core member 72a, so that deformation of the housing has little or no effect on the relative spacing of these members and, accordingly, does not change the impedance of the winding 72b. The windings 72b and 70b are connected in a bridge circuit with an adjustable impedance bridge element 147 having a movable contact 147a, across an alternating current source represented by the transformer 148, with control windings 149 of the mill housing strain or deformation servo 75 connected in bridging relation between contact 147a and the junction 71 of windings 70b and 72b.

The mill housing deformation servo 75 comprises, as shown in FIG. 4B, a strain servo system 150 consisting of a reversible magnetic amplifier having a plurality of magnetic cores 100 arranged in pairs. These cores are provided with flux resetting windings 151 connected to the transformer 148 through oppositely disposed rectifier devices 152 for effecting unidirectional energization of these windings. One pair of cores 153 is provided with load windings 154 connected in parallel circuit relation through oppositely disposed rectifier devices 155 for connecting control windings 156 on the other pair of cores 157 to the transformer 148 for energizing the control windings with an alternating current voltage of one phase or another, depending on the phase relation of the voltage applied to control windings 149 on the pair of cores 153 from the strain gauge bridge circuit including the impedance 147 and strain gauge windings 70b and 72b.

The second pair 157 of cores 100 is provided with load windings 159 connected in parallel circuit relation through oppositely disposed rectifier devices 160 for reversibly energizing one phase of the servomotor 76 from the transformer 148, depending on the relative phase relation of the voltage applied to control windings 156. The other phase of the servomotor 76 is energized directly from the alternating current transformer 148 through a capacitor 162, so that reversal of the phase relation of the voltage applied from the load windings 159 effects reversal of the servomotor.

A tachometer generator 77 is driven by the servomotor for producing a voltage proportional to the rate of deformation of the mill housing. This voltage is applied to feedback winding 164 on the pair of cores 153 which are differential, for stabilizing the operation, and is also applied to cumulative and differential control windings 166 and 166′ disposed on magnetic cores 100 of a deformation rate magnetic amplifier 167 forming part of the deformation servo 75. Each of the cores is provided with a load winding 101, the windings of each pair of cores being connected in parallel circuit relation through oppositely disposed rectifier devices 104 and connected to an alternating current source represented by control transformers 136 for reversibly energizing the deformation rate control winding 141 of the screwdown regulator first stage 64 through rectifier bridge circuits 103. The cores 100 are each provided with a differential bias winding 106 and an anti-hunt winding 168 energized in accordance with the output voltage of the magnetic amplifier.

The mill speed integrating servo circuit 86 of FIG. 4A comprises a plurality of magnetic cores 100, each of the cores being provided with a flux resetting winding 151 connected to an alternating current source represented by the control transformer 170 in series with oppositely disposed rectifier devices 152 for providing unidirectional energization of the reset windings. One pair 172 of the magnetic cores is provided with load windings 173 connected to the transformer 170 and to control windings 175 on the other pair 176 of the core members in circuit with oppositely disposed rectifier devices 177 for energizing the control windings 175 with alternating current voltages of opposite phase relations depending upon the direction of energization of control windings 178. The pair of cores 176 are provided with load windings 180 for connecting one phase of the servomotor 87 to the transformer 170 through oppositely disposed rectifier devices 181 for energizing said phase with an alternating current voltage of reversible phase. The other phase of the servomotor 87 is energized directly from the transformer 170 through a capacitor 182 to provide for operating the servomotor in opposite directions. The tachometer 88 driven by the servomotor 87 is connected in series with the control windings 178 and in opposition to a portion of the output voltage of the roll motor pilot generator 22, so as to match the voltage of the tachometer against a predetermined portion of the voltage of the mill roll pilot generator dependent on the taper value set, and provide for reversibly energizing the windings 178 in accordance with the differential between the voltage of the tachometer 88 and the voltage of the mill pilot generator, derived from potentiometer 194 in FIG. 4G as modified by the setting of the taper rheostats in the speed differential circuit 66. The voltage of the tachometer 88 will thus approach $$\alpha = \frac{dx}{dt}$$

and the shaft position of the tachometer corresponds to Y which is equal to the integral of $$\frac{dy}{dt}$$

The profile mixer 65 comprises a reversible magnetic amplifier having a plurality of magnetic cores 100 arranged in pairs and provided with load windings 184 for connecting the position error control windings 140 of the first stage amplifier 64 to a source of alternating current represented by transformers 134, through rectifier bridge circuits 103, to provide for selectively oppositely energizing the position error windings. Each of the cores is provided with a bias winding 106 energized differentially with respect to its particular load winding, the load windings of each pair, of course, being connected in parallel circuit relation in series with oppositely disposed rectifier devices 104. Anti-hunt windings 186 are provided which are energized in parallel with the windings 143 of the first stage, in opposition to the load windings 184. Deformation windings 187 are provided on each of the cores which are energized from a deformation potentiometer 93 having a movable contact which is actuated by the servomotor 76 in accordance with the deformation of the mill housing. Reference position windings 189 are provided on the cores 100 and are connected to the zero reference potentiometer 95 and a position-responsive potentiometer 90 having a movable contact 90a actuated by the mechanical differential 84 in response to differentials between the operating position of the servomotor 87 which is responsive to the vertical position of the rolls as derived from longitudinal position of the strip for a given taper, and the operating position of the selsyn receiver 81 which is responsive to the actual roll position, being coupled to the selsyn transmitter 80 and driven by the screw-down motor 52.

Regulation of the taper rate is effected by matching a portion of the output voltage of the screw-down pilot generator 68 measured across resistor 190, against a portion of the output voltage of the roll motor pilot generator 22, as measured across either of the taper rheostats 192 or 193, which will be adjusted for a predetermined ratio of voltages for each desired value of taper. The differential between the portions of the voltages just matched is applied to the control winding 142 of the first stage regulator 64. Taper relays 1CR and 2CR are provided for selectively connecting the rheostats 192 and 193 and the taps 190a and 190b for different ranges of taper.

The speed of the mill is determined by the motor-operated rheostat 50, which is operated by a rheostat motor 195 having a field winding 195w and an armature 195a. Reversing switches RHF and RHR are provided for reversibly connecting the armature 195a of the rheostat motor to a source of control voltage. In order to provide for setting a particular maximum mill speed for each value of taper, a rheostat motor control relay PSR is provided having a polarizing winding 196 and a control winding 197. The control winding 197 is connected to one contact arm 50d of the motor-operated rheostat and to the movable contact of either one of sections 192′ or 193′ of the taper rheostats 192 and 193. This connection is likewise made through contacts of relays 1CR and 2CR depending on which taper rheostat is being used. Contact arms 192a and 192′a are mechanically coupled, as are arms of 193 and 193′. The control relays 1CR and 2CR which are provided for selecting which of the taper rheostats is to be used, operate under the control of a taper selector switch 198 which, for purposes of simplicity, is shown as controlling only two such relays. More relays and more taper rheostats can obviously be used, if desired, for covering a greater number of ranges of taper.

The control winding 196 of the rheostat motor control relay PSR is thus connected in bridged relation between the moving contact 50d of the motor-operated rheostat, and the moving contact 192′a or 193′a of whichever of taper rheostats 192′ or 193′ is connected in the circuit, so that for a given setting of the taper rheostat, the relay PSR will respond to a differential voltage between these contacts, and the rheostat motor will operate to such point at which the voltage on contact 50d balances that of the particular taper rheostat setting; whereupon, the relay PSR becomes deenergized. Thus, the relay PSR controls the operation of relays RHR and RHF, and operates the rheostat motor in one direction or the other to produce a roll motor generator voltage of a particular value for a given setting of taper. A drum type limit switch 199 driven by the rheostat motor 195, has "forward" and "reverse" segments 199a and 199b to provide for limiting the movement of the rheostat motor and returning it to the reset position in which contact 199c provides an operating circuit for a suicide relay SCA which shunts down the reference exciter 46 under the control of a mill running relay R. A mill taper switch 200 having "forward," "reverse" and "reset" segments 200a, 200b and 200c is provided, for controlling the operation of relays IF and IR, which reverse the connections of the taper rheostat sections 192′, 193′ relative to the winding 197 of the control relay PSR, so as to reverse the direction of operation of the rheostat motor, for reversing operation of the mill. A screw-down taper switch 202 is provided for controlling the operation of screw-down control relays 8CR and 9CR for operating the screw-down motor either up or down, so as to reverse the direction of the taper for a given direction of the mill. A selector switch 205 provides either automatic or manual control for taper by controlling set up relays SAR and SAR1. Setup relay SAR operates to set up operating circuits for the taper setup relays 1CR and 2CR during automatic operation. A control relay 10CR provides for connecting the screw-down pilot generator and roll motor pilot generators to the speed differential circuit 66 under the control of taper switch 202 for controlling the taper. Setup relay SAR1 provides for disconnecting the control transformers 136 of the first stage of the screw-down control from the alternating current source 135 whenever the control is not set for automatic taper so as to render the first stage inoperative. A transfer relay 1CRR is provided for transferring the voltage windings 142 of the current limit regulator 63 from the output of the first stage regulator 64 to the manual control switch 130 whenever the control is set for manual operation. The control relay 10CR is provided with reset contacts (a) (b) and (c) for connecting the output of the profile mixer 92 to the input of the velocity servo 86, and adjust the input voltage to the profile mixer so as to reset the velocity servo to be in the correct position prior to starting a taper rolling operation. A manual control switch 206 is provided for applying a control voltage to the operating winding 197 of the rheostat motor control relay PSR when the selector switch 205 is positioned for manual operation, so as to provide for operating the mill under manual control, either to jog the sheet into a particular position or to run the mill either forward or backward, as when flat rolling without the use of taper control.

With the selector switch 205 set for manual control, circuits are provided through contact 205m extending from positive through conductor 207, conductor 208, contact member 205m and conductor 209, thence by conductor 210 to negative at the manual control switch 206. Operation of the relay PSR may be effected in either direction and at a speed determined by the position of the movable contact 206a, since operating winding 197 is connected between contact 206a and contact arm 50d, thus operating the rheostat motor 193 to determine the polarity and value of the energization of the main field winding 49 of the reference exciter 46, which is connected between contact arms 50e and 50f. This determines the energization of the pattern field winding 115 of the generator regulator 44 under the control of error winding 117, and determines which of the field windings 40 and 41 of the generator exciter 38 will be energized, thus determining the polarity and value of the voltage of the generator 32 and, hence, the direction and speed of the roll motor 18.

At the same time, voltage is applied to the manual control switch 130 through conductor 211 and conductor 212. The switch 130 may be operated in either direction to effect energization of the voltage windings 127 of either the "forward" or "reverse" amplifiers 120 and 121, to selectively effect energization of field windings 59 and 60 of the screw-down generator 56, so as to raise or lower the roll 11 through operation of the screw-down motor 52. Under these conditions of operation, the control relay 1CRR of FIG. 3C is energized, and the voltage winding 142 of the current limit regulator 63 is connected to the manual control switch 130 through contacts a and c of 1CRR, so as to limit the current in accordance with the voltage applied. Since the selector switch 205 is in the manual position, control relay SAR1 is deenergized, and the load windings 101 of the first stage 64 are disconnected from the alternating current sourse, thus rendering the regulator ineffective. Under these conditions the mill motor field regulator 30, the mill generator regulator 44, the second stage regulator 62, and the current limit regulator 63 are operative.

With the selector switch 205 operated to the automatic position, relay SAR and relay SAR1 will be energized through contact 205a. This can be done after the roll 11 has been jogged manually to approximately the correct position through use of switch 130. The manual control switch 206 and the jog switch 130 are now disconnected from the source. The taper switch 202 may be operated to energize either relay 8CR for upward operation of the screwdown, or relay 9CR for downward operation, let us assume relay 8CR, for example, and the taper selector switch 198 will be operated to energize either relay, let us assume relay 1CR or 2CR, depending on the particular value of taper desired. The mill selector switch 215 will be closed, energizing the taper rolling setup switch 7CR which connects the relays IF and IR for operation under control of the mill taper switch 200.

With the relay 1CR energized, and contact of switch 202 providing an energizing circuit for relay 8CR, for example, the taper rheostat 192 is connected across the armature of the roll motor pilot generator 22 through contacts a and b of relay 8CR and contact c of relay 1CR. With the screw-down taper control relay 10CR energized, the control winding 139 of the first stage regulator 64 is connected to be energized in accordance with the difference between a portion of the screw-down pilot generator voltage as determined by the setting of contact 192a which determines the taper. The circuit extends from windings 139 through conductor 217, contact member 10CRc, contact member 1CRb, movable contact member 192a, a portion of taper rheostat 192, conductor 218, contact member 1CRd, conductor 219, a portion of resistor 190, conductor 220, contact member 10CRd, and conductor 221 back to windings 139, thus matching a portion of the voltage of the screw-down pilot generator from contact 190a against a predetermined portion of the voltage of the roll motor pilot generator 22, dependent upon the setting of the movable contact 192a. This determines the speed and direction of the screw-down motor 52, relative to that of the roll motor 18, by controlling the conductivity of load windings 101 of the first stage 64 and hence the energization of control windings 132 of the first stage 62, which in turn controls energization of field windings 59 and 60 to maintain a predetermined constant speed of the screw-down motor 52 relative to the roll motor 18 and thus regulate for α the taper rate.

At the same time that the movable contact 192a is adjusted, the movable cotnact 192a′ is also adjusted. This determines the balance point of the control relay PSR and, hence, determines both the direction and distance of travel of the rheostat motor 195, since the relay PSR controls the directional relays RHF and RHR of the rheostat motor, through moving contact (a) of relay PSR. Thus, the voltage of the reference exciter 46 will be predetermined for a given setting of the taper rheostat 192 and the speed of the roll motor 18 is set.

While the control winding 139 selectively controls the operation of the first stage regulator 64, to reversibly energize the control windings 132 of the second stage regulator to maintain a predetermined relationship between the speeds of the screwdown and roll motors, and thus control the taper rate in accordance with the adjustment of the taper rheostat 192, the strain servo 150 of the mill housing deformation servo 75 operates in response to variations in the impedance of the strain gauge winding 70b to produce a reversible alternating current voltage for controlling the strain servo device 76. This operates in accordance with the direction and value of the voltage, driving the strain tachometer 77 to produce a signal responsive to the rate and direction of deformation, which is applied to the feedback winding 164 and also to the control winding 166 of the deformation rate amplifier 167. The output of the amplifier 167 is applied to the deformation rate windings 144 of the first stage, differentially with respect to the signal on the control windings 142, so as to compensate for the effect of deformation of the housing and give a true comparison of the relative speeds of the rolls upwardly and the strip in a longitudinal direction. At the same time, the movable contact 93 of the deformation potentiometer 93 is actuated by the servomotor 76 to vary the energization of the deformation windings 187 on the profile mixer, and the servomotor also operates the movable contact 147a of the adjustable impedance 147 in a direction to rebalance the strain gauge bridge circuit and restore the energization of deformation windings 149 of the strain servo 150 to normal. The movable contact 90a of the position reference potentiometer 90 is operated by the differential device 84 in response to any differential between the screw-down position, as indicated by the selsyn receiver 81, and the shaft position of the velocity servomotor 87 as controlled by the velocity servo system 86, to vary energization of the position reference windings 189 of the profile mixer 92 to provide a corrective signal output in load windings 184. This signal is applied to the position error windings 140 of the first stage amplifier 64 in a direction to change the taper rate so as to restore the movable roll 11 to the correct profile position, and is in opposition to the taper rate signal obtained from the pilot generators, which tends to maintain a constant taper rate and the latter also acts as a feedback to stabilize the operation.

To stop the mill, as at the end of a pass, the screw-down taper switch 202 will be returned to its "off" or neutral position. Relays 8CR and 10CR are deenergized. Contact e of relay 10CR bypasses contacts of 1CR and 2CR in the input circuit of the profile mixer 92, and reset contacts a and b of relay 10CR connect the output of the profile mixer to the input of the velocity servo 86 at conductors 223 and 224 to reset the servo device 87 in the proper position prior to starting a taper rolling pass.

From the above description and the accompanying drawings, it will be apparent that we have provided in a taper control system for a rolling mill for accurately controlling the longitudinal taper of a strip or a sheet of material being rolled. The cumulative effects of errors in taper rate control are overcome by using profile control, so that any instantaneous error in the taper rate produces a restoring force of high magnitude. Likewise, when the profile control is operating to force the system, the effects of profile control are offset by the effects of taper rate control which operate in a direction to prevent a rapid change in the relative speeds of the screw-down roll motor.

Since certain changes may be made in the above-described construction without departing from the spirit and scope thereof, it is intended that all of the matter contained in the above description and shown in the accompanying drawings shall be considered as illustrative and not in a limiting sense.

We claim as our invention:

1. In a control system for a rolling mill having a screw-down motor operatively connected to vary the spacing between rolls of the rolling mill and a mill motor connected in driving relation with the rolls, a regulator connected to control the speed of the screw-down motor, means including pilot generators driven by the motors connected to control the regulator to maintain a predetermined speed ratio of the motors, and means connected to the regulator for also controlling the regulator in accordance with a position error of the rolls between the position determined from the roll position derived from the screw-down motor shaft position and its position as determined by the speed of the mill and the predetermined speed ratio of the mill and screwdown motors.

2. A control system for a pair of motors comprising, speed regulating means connected to control the speed of one of said motors, first means producing a voltage responsive to the speed of said one motor, second means producing another voltage responsive to the speed of the other of said motors, adjustable impedance means connected to match different portions of said voltages and apply the differential to said regulating means to maintain different ratios of the motor speeds, control means operable to vary the speed of the other motor, and adjustable impedance means operatively connected with the aforesaid adjustable impedance means operable to effect operation of the speed varying control means to provide different speeds of said other motor for different speed relations of said pair of motors.

3. In a taper control system for a roll stand having a pair of rolls in a deformable housing with roll and screw-down motors for rotating and varying the separation of the rolls, a regulator connected to effect operation of the screw-down motor, means for producing a reversible variable voltage, regulating means having a plurality of excitation windings, means including a strain element on the housing producing a voltage which is a derivative of the deformation in the housing and connected to apply it to one of said windings, means producing voltages in accordance with the speeds of the screw-down and roll motors, adjustable impedance means connected to said speed voltage means to match different portions of said voltages and apply a differential therebetween to another of said windings, and profile error means connected to apply a profile error voltage to get another of said windings, said profile error means having a winding connected to be energized by a voltage in accordance with a differential between a predetermined angular relation of the motor shafts and another winding connected to be energized by a voltage in accordance with the deformation of said housing.

4. A taper control system for a rolling mill having a pair of rolls, driving means for at least one of the rolls, and screw-down means operable to vary the position of one roll relative to the other to change the spacing between the rolls comprising, regulating means operable to control the speed of the screw-down motor, means connected to apply to the regulator a signal responsive to a difference between a voltage responsive to the speed of the screw-down motor and a predetermined portion of a voltage responsive to the speed of the mill motor to provide a predetermined ratio between the speeds of the motors and determine the taper of material rolled, and circuit means connected to apply to the regulator a signal responsive to the difference between the spacing between the rolls as measured by the position of the movable roll and the spacing between the rolls as determined from the integrated value of the mill speed and the value of the taper being rolled.

5. A control system for motors connected in driving relation with the screw-down mechanism and rolls respectively of a pair of rolls supported in a mill housing comprising, regulating means connected to control the operation of the screw-down motor, means connected to effect control of the regulator in response to the speeds of the motors to maintain a predetermined speed ratio therebetween, means producing a signal responsive to the deformation of the roll housing, and means connected to modify the control of the regulator in accordance with a signal which is the differential of said deformation responsive signal.

6. A control system for a pair of motors comprising, regulating means connected to control the operation of one motor, means including an adjustable impedance connected to effect control of the regulator to maintain different speed relations between the motors, and position regulating means including said adjustable impedance means connected to effect control of the regulator in response to a departure from a predetermined angular position relation of the motor shafts for a given adjustment of the adjustable impedance means.

7. Apparatus for taper rolling a material in a longitudinal direction in a rolling mill having a pair of work rolls rotatably mounted in a housing with screw-down means operable to vary the distance between the rolls comprising, a main motor connected in driving relation with the rolls, a screw-down motor connected to operate the screw-down means, a pilot generator connected to each motor to produce a voltage in accordance with the speed thereof, regulating means connected to effect operation of the screw-down motor, an adjustable impedance connecting the pilot generators and the regulating means to different predetermined portions of the voltages and a differential therebetween to the regulating means, an impedance bridge including a strain gauge element connected for measuring deformation of the roll housing and an adjustable bridge balancing impedance, a tachometer, a servomotor connected in driving relation with the tachometer, amplifier means connected to effect the operation of the servomotor in response to unbalance in the impedance bridge, means connecting the servomotor to adjust the bridge balancing impedance, means connected to apply to the regulating means a voltage in accordance with the tachometer voltage, an amplifier connected to apply a position error voltage to the regulating means, circuit means connected to the amplifier to effect operation of the amplifier in accordance with the angular operating position of the servomotor, and differential means connected to effect operation of the amplifier in accordance with a positional error of the screw-down means including position responsive means operable to determine the operating position of the screw-down mechanism, and servo means responsive to the predetermined portion of the roll motor pilot generator voltage.

8. In a control system for a pair of electric motors, regulating means operatively connected to one of said motors to maintain a predetermined speed relation of said one of said motors with respect to the other motor, control means operable to vary the speed of said other motor, adjustable circuit means connected to effect operation of the regulating means to maintain different predetermined speed relations between said motors, and means responsive to different adjustments of said circuit means to effect operation of the control means to provide different predetermined speeds of said other motor for each such predetermined speed relation.

9. A control system for a pair of motors comprising, a regulator connected to control the speed of one of the motors, means operatively connected to each of said motors for producing voltages dependent on the speeds of the motors, control means operable to different positions and operatively connected to the other of said motors to vary the speed of the other of said motors, circuit means including an adjustable control device connected to apply to the regulator different portions of said voltages to maintain different speed relations between said motors, and relay means operatively connected to be selectively responsive to the adjustment of the control device and the position of the control means to effect operation of said control means to produce a different speed of said other of the motors for each such different voltage.

10. In a control system for a roll motor and a screw-down motor operating rolls of a roll stand, regulating means connected to at least said screw-down motor to maintain predetermined speed relations between the roll and screw-down motors, control means operable to vary the speed of said roll motor, additional control means including adjustable impedance means connected to said regulating means to predetermine different speed relations between the motors, and speed control means actuated by the adjustable impedance means connected to operate the control means to determine a different speed of the roll motor for each different speed relation thereof with the screw-down motor.

11. In a control system for a pair of motors, first and second pilot generators operatively connected respectively for producing a voltage in accordance with the speed of each of said motors, a regulator controlling the speed of one of the motors, adjustable impedance means connected to the pilot generators and said regulator to match different portions of said voltages and apply a differential therebetween to the regulator to maintain different ratios of speed between said one motor and the other motor, a motor-operated rheostat connected to vary the speed of the other motor, relay means controlling the operation of the motor of said rheostat, and circuit means including adjustable impedance means adjustable in accordance with adjustment of the aforesaid adjustable impedance means connected to effect operation of said relay to operate the rheostat motor to provide different predetermined operating speeds for said other motor for each different ratio of motor speeds.

12. In a control system for a pair of motors, a speed regulator connected to control one motor, first control means producing a voltage responsive to the speed of said one motor, second control means producing a voltage responsive to the speed of the other motor, adjustable circuit means connected to each of said first and second control means and the regulator to compare different predetermined portions of one voltage with said other voltage and apply the difference to said regulator, means operable to determine the speed of the other motor, and circuit means including a control device connected to effect operation of said speed determining means in accordance with the different adjustments of said adjustable circuit means to compare different portions of said one voltage with the other voltage.

13. In a control system for the roll and screw-down motors of a pair of rolls mounted in a deformable roll housing, a bridge circuit including a strain gauge device mounted on the housing to measure deformation of the roll housing, magnetic amplifier means having a winding connected in circuit with the strain gauge device for producing an output signal in accordance with deformation of the housing, a servomotor connected to be controlled by said magnetic amplifier means, tachometer means driven by said servomotor and having an output in accordance with the rate of deformation of said housing, a feedback winding on the magnetic amplifier means connected to be energized from the tachometer means, impedance means connected in said bridge circuit and adjustable by said servomotor to rebalance the bridge circuit, a regulator connected to control the speed of the screw-down motor, means connected to apply to said regulator a voltage in accordance with the output of said tachometer, first and second voltage producing means operatively connected to each of said motors for respectively producing voltages in accordance with the speeds of the screw-down and roll motors, impedance means connected to each of said speed voltage producing means to match predetermined portions of said voltages and apply the resultant to the regulator, a profile regulator having an output circuit connected to apply a position error voltage to the regulator and having a plurality of input circuits, circuit means connected to apply to one of said input circuits a voltage varying in accordance with the angular position of the shaft of said servomotor, position responsive means producing a signal responsive to the predetermined portion of the mill pilot generator voltage matched with the screw-down pilot generator voltage, and means connected to apply to another of said input circuits a voltage responsive to a differential between the signal of the position responsive means and a signal of the circuit means responsive to the angular position of said motor shaft.

14. In a control system, a variable impedance strain gauge element, magnetic amplifier means having a plurality of windings, circuit means including windings of said amplifier means connected to be energized from the strain gauge element, adjustable impedance means connected to said element for balancing changes in the impedance of the strain gauge element, a motor connected to said impedance means to effect a change in the adjustment of said impedance means, additional amplifier means connected to the motor and to the magnetic amplifier means to effect operation of said motor under control of said magnetic amplifier, and generating means actuated by said motor and connected to energize another of said plurality of windings on said magnetic amplifier means.

15. In a control system for the roll and screw-down motors of a rolling mill, first and second pilot generators respectively driven by each of said motors, regulating means connected to control the operation of the screwdown motor, circuit means connecting the pilot generators and regulator to match a predetermined portion of the voltage of the roll motor pilot generator against a predetermined portion of the screw-down pilot generator voltage and operatively connected to control the operation of the regulating means in accordance with a differential therebetween, means connected to the screw-down motor to be responsive to the angular position of the screw-down motor shaft, a servo device operable with the roll motor pilot generator to be responsive to said predetermined portion of the roll motor pilot generator voltage to measure the theoretical angular position of the screw-down motor shaft, and circuit means connected to apply to the regulating means a voltage in accordance with an error between the actual and theoretical angular shaft positions as thus determined.

16. In a drive for a rolling mill having a pair of work rolls rotatably mounted in a roll housing with screw-down means operable to vary the spacing between the rolls, a roll motor connected in driving relation with one of the rolls, a screw-down motor connected in driving relation with the screw-down means, first and second pilot generators respectively connected to produce a voltage in accordance with the speed of each motor, a regulator connected to control the operation of the screw-down motor, adjustable impedance means connecting the pilot generators and the regulator to match different portions of the respective pilot generator voltages and effect control of the regulator in accordance with a differential therebetween, speed control means including a motor-operated rheostat connected to vary the speed of the roll motor, means operated by the adjustable impedance means to effect operation of said rheostat in accordance with the adjustment of said adjustable impedance means, deformation measuring means connected to the mill housing for measuring the deformation of the mill housing, circuit means connected to the regulator for modifying the control of the regulator in accordance with the rate of deformation of the mill housing, means connected to said screw-down motor to be responsive to the operating position of the screw-down motor, a servomechanism operated in accordance with said portion of the roll pilot generator voltage matched with said portion of the screw-down pilot generator voltage, first control means differentially connected to be responsive to the screw-down motor position responsive means and to the servomechanism to effect control of the regulator in accordance with a position error of the screw-down means, and second control means operatively connected to said first control means and responsive to the deformation of the housing for modifying the latter said control of the regulator.

17. A control system for the roll and screwdown motors of a rolling mill having a deformable housing for mounting the rolls comprising: a regulator connected to effect operation of the screwdown motor in accordance with a plurality of control signals and having magnetic core means with a plurality of control windings; means connected to apply to different of said control windings signals respectively responsive to a departure from a predetermined speed relation of the motors, an error in position of the screwdown motor for a given operating position of the roll motor, and a signal proportional to the rate of deformation of the roll housing; and an additional regulator having magnetic core means with load windings connected to control the supply of electrical energy to the screwdown motor and including a control winding connected to be energized under the control of the first-mentioned regulator.

18. A control system for the screwdown motor and drive motor of a pair of rolls supported in a deformable roll housing comprising, a regulator connected to regulate the operation of the screwdown motor, means including pilot generators driven by the screwdown and roll motors and operative to provide respective voltages in accordance with a predetermined operation of said motors and including adjustable impedance means connecting the pilot generators and the regulator to match different portions of said voltages and apply a differential therebetween to the regulator to maintain different speed relations between said motors, means connected to apply to the regulator a voltage varying in accordance with a differential from a predetermined angular relation of the shafts of said motors, and circuit means connected to apply to said regulator a voltage responsive to the rate of deformation of the roll housing.

19. A drive for a rolling mill having a pair of work rolls rotatably mounted in a roll housing with screwdown means for varying the spacing therebetween comprising, a roll motor connected in driving relation with one of said rolls, a screwdown motor connected in driving relation with said screwdown means, first and second pilot generators respectively connected to be operative with said roll and screwdown motors for producing a voltage in accordance with the speed of each of the roll and screw-down motors, control means operatively connected to said screwdown motor and including a magnetic amplifier having a plurality of input circuits and an output circuit connected to control the operation of the screwdown motor, adjustable impedance means connecting said pilot generators in opposed relation to one of said input circuits to match different portions of the voltages produced by the roll pilot generator and screwdown pilot generator and to apply the resultant voltage to said one input circuit to maintain different predetermined ratios between the speeds of the screwdown and roll motors, regulating means connected to control the operation of said roll motor, means actuated by the adjustable impedance means to control the operation of the roll motor regulating means to maintain a different speed of the roll motor for each adjustment of the adjustable impedance means, a profile regulator having an output circuit connected to another of said control means input circuits and having a plurality of input circuits, means including a strain gauge connected to the roll housing and having a variable impedance member responsive to deformation of the roll housing for controlling the output voltage of a tachometer at a rate dependent on the deformation of the housing, means applying to another of the input circuits of the screwdown motor control means a signal in accordance with said output voltage of said tachometer, a differential device operative with a potentiometer member, circuit means connecting said potentiometer member to one of the input circuits of the profile regulator in combination with a reference voltage, means responsive to the position of said tachometer and connected to apply a variable voltage to another of the input circuits of the profile regulator, means responsive to the operating position of the screwdown means for driving one side of said differential device, and means responsive to a portion of the roll motor pilot generator voltage matched against a portion of the screwdown pilot generator voltage and connected for driving the other side of said differential device.

20. In a control system for controlling the operation of one of two motors having an operating relation with a common mechanical structure relative to the other, said mechanical structure having a rate of deformation, regulating means connected to control the operation of said one motor, circuit means connected to apply to said regulating means a voltage responsive to a differential between the speeds of the motors and a predetermined speed relation, additional circuit means connected to apply to said regulating means a voltage responsive to a departure from a predetermined angular shaft positioning of the one motor relative to the other, and other circuit means connected to apply to said regulating means a voltage responsive to the rate of deformation of said structure by which the motors are operatively related.

21. In a regulating system for a pair of motors, a first regulator connected to control the speed of one of said motors, means responsive to the speeds of said motors and connected to effect operation of the regulator to maintain different predetermined speed relations of the motors, a position regulator including a servo device operable from an initial position in response to the operation of at least one of said motors and connected to effect the operation of the first regulator in accordance with an error from a predetermined angular relation of the motor shafts for a given predetermined speed relation, and means connected to apply a reset signal to the servo device to restore it to said initial position.

References Cited in the file of this patent

UNITED STATES PATENTS

| | | |
|---|---|---|
| 1,684,077 | Staege | Sept. 11, 1928 |
| 1,928,464 | Roberts | Sept. 26, 1933 |
| 1,971,840 | Willis | Aug. 28, 1934 |
| 2,092,051 | Cook | Sept. 7, 1937 |
| 2,287,283 | Weber | June 23, 1942 |
| 2,320,850 | Cook | June 1, 1943 |
| 2,666,878 | Fisher | Jan. 19, 1954 |
| 2,687,052 | Zeitlin | Aug. 24, 1954 |